(12) United States Patent
Do et al.

(10) Patent No.: US 10,804,504 B2
(45) Date of Patent: Oct. 13, 2020

(54) EXTERIOR PACKAGE FOR FLEXIBLE ELECTROCHEMICAL DEVICE AND ELECTROCHEMICAL DEVICE INCLUDING THE EXTERIOR PACKAGE

(71) Applicant: Samsung Electronics Co., Ltd., Suwon-si, Gyeonggi-do (KR)

(72) Inventors: Euncheol Do, Suwon-si (KR); Moonseok Kwon, Suwon-si (KR); Jaeman Choi, Suwon-si (KR); Yoonhoi Lee, Suwon-si (KR); Jaejun Chang, Suwon-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 409 days.

(21) Appl. No.: 15/219,568

(22) Filed: Jul. 26, 2016

(65) Prior Publication Data

US 2017/0047560 A1    Feb. 16, 2017

(30) Foreign Application Priority Data

Aug. 13, 2015  (KR) .................. 10-2015-0114551

(51) Int. Cl.
| | |
|---|---|
| *H01M 2/02* | (2006.01) |
| *H01M 10/0525* | (2010.01) |
| *H01G 11/78* | (2013.01) |
| *H01G 11/26* | (2013.01) |
| *H01M 10/052* | (2010.01) |

(52) U.S. Cl.
CPC .......... *H01M 2/0207* (2013.01); *H01G 11/26* (2013.01); *H01G 11/78* (2013.01); *H01M 2/0212* (2013.01); *H01M 2/0275* (2013.01); *H01M 2/0287* (2013.01); *H01M 10/0525* (2013.01); *H01M 10/052* (2013.01); *H01M 2220/30* (2013.01)

(58) Field of Classification Search
CPC .................................................. H01M 10/0525
See application file for complete search history.

(56) References Cited

U.S. PATENT DOCUMENTS

| | | |
|---|---|---|
| 7,157,188 B2 | 1/2007 | Yamaguchi et al. |
| 8,486,558 B2 | 7/2013 | Kwon et al. |
| (Continued) | | |

FOREIGN PATENT DOCUMENTS

| | | |
|---|---|---|
| EP | 2975667 A1 | 1/2016 |
| JP | 2000173559 A | 6/2000 |
| (Continued) | | |

OTHER PUBLICATIONS

KR20160089179 Espacenet English Machine Translation Jul. 2016.*

(Continued)

*Primary Examiner* — Jonathan G Leong
*Assistant Examiner* — Aaron J Greso
(74) *Attorney, Agent, or Firm* — Cantor Colburn LLP

(57) ABSTRACT

An exterior package for an electrode assembly of an electrochemical device includes a plurality of linear patterns. Each of the linear patterns has a cross-section of an uneven structure in a thickness direction of the electrode assembly and a linear pattern of the linear patterns includes a first element line and a second element line, which extend in different directions on a plane perpendicular to the thickness direction of the electrode assembly.

35 Claims, 30 Drawing Sheets

(56) References Cited

U.S. PATENT DOCUMENTS

| | | |
|---|---|---|
| 8,987,585 B2 | 3/2015 | Lee |
| 9,222,414 B2 | 12/2015 | Eto et al. |
| 2011/0159382 A1 | 6/2011 | Matsui et al. |
| 2013/0083496 A1 | 4/2013 | Franklin et al. |
| 2013/0101884 A1 | 4/2013 | Ueda |
| 2013/0171485 A1 | 7/2013 | Kodera et al. |
| 2014/0220423 A1 | 8/2014 | Yi et al. |
| 2015/0072179 A1 | 3/2015 | Itabashi |
| 2015/0155528 A1 | 6/2015 | Takahashi et al. |
| 2015/0221995 A1 | 8/2015 | Robert et al. |
| 2015/0349375 A1* | 12/2015 | Takahashi .............. H01G 9/048 429/7 |
| 2016/0329546 A1 | 11/2016 | Ham et al. |
| 2017/0025682 A1 | 1/2017 | Ji et al. |

FOREIGN PATENT DOCUMENTS

| | | |
|---|---|---|
| JP | 2005347077 A | 12/2005 |
| JP | 2009079819 A | 3/2009 |
| JP | 2012113843 A | 6/2012 |
| KR | 101066446 B1 | 9/2011 |
| KR | 101091405 B1 | 12/2011 |
| KR | 101217780 B1 | 12/2012 |
| KR | 1020130002357 A | 1/2013 |
| KR | 101302357 B1 | 8/2013 |
| KR | 1020130119700 A | 11/2013 |
| KR | 1020140058730 A | 5/2014 |
| KR | 1020140100085 A | 8/2014 |
| KR | 1020150065142 A | 6/2015 |
| KR | 20160089179 * | 7/2016 ............... G06F 1/16 |
| KR | 1020160131266 A | 11/2016 |
| KR | 1020170010587 A | 2/2017 |
| WO | 2016036157 A1 | 3/2016 |
| WO | 2016080728 A1 | 5/2016 |

OTHER PUBLICATIONS

KR20160089179 Espacenet Abstract Jul. 2016.*
European Examination Report for Application No. 16 184 052.5 dated Jan. 16, 2018, citing the above reference(s).
Extended European Search Report for Application No. 16184052.5 dated Nov. 24, 2016, citing the above reference(s).

* cited by examiner

EXTERIOR PACKAGE FOR FLEXIBLE ELECTROCHEMICAL DEVICE AND ELECTROCHEMICAL DEVICE INCLUDING THE EXTERIOR PACKAGE

CROSS-REFERENCE TO RELATED APPLICATION

This application claims priority to Korean Patent Application No. 10-2015-0114551, filed on Aug. 13, 2015, and all the benefits accruing therefrom under 35 U.S.C. § 119, the content of which in its entirety is herein incorporated by reference.

BACKGROUND

1. Field

The disclosure relates to an electrochemical device, and more particularly, to an exterior package for an electrode assembly of a flexible electrochemical device and an electrochemical device including the exterior package.

2. Description of the Related Art

As demand for smart devices has increased, wearable electronic devices have been widely developed. Wearable electronic devices typically have a flexible shape to improve fit. In wearable electronic devices, a flexible electrochemical device is typically included to supply power to the wearable electronic device. The electrochemical device is capable of storing energy and may include, for example, a secondary battery or a super capacitor. Recently, lithium secondary batteries are widely used as power sources for smart devices.

SUMMARY

In a flexible electrochemical device, an exterior package is typically provided for an electrode assembly therein. The exterior package for an electrochemical device may cover and seal the electrode assembly, and thereby effectively prevent penetration of external moisture and leakage or volatilization of an electrolyte inside the exterior package to the outside. However, when the exterior package is damaged by a repeated external force, the airtightness of the exterior package is deteriorated, and accordingly, the performance of an electrochemical device including the electrode assembly may be degraded.

Exemplary embodiments are directed to an exterior package for an electrode assembly of a flexible electrochemical device and an electrochemical device including the exterior package.

According to an exemplary embodiment, an exterior package for an electrode assembly of an electrochemical device includes a plurality of linear patterns, where each of the linear patterns has a cross-section of an uneven structure in a thickness direction of the electrode assembly, and a linear pattern of the linear patterns includes a first element line and a second element line, which extend in different directions on a plane perpendicular to the thickness direction of the electrode assembly.

In an exemplary embodiment, the first and second element lines may be inclined with respect to a first direction perpendicular to the thickness direction of the electrode assembly.

In an exemplary embodiment, the first direction may be a widthwise direction of the electrode assembly or a lengthwise direction of the electrode assembly.

In an exemplary embodiment, the linear patterns may be repeatedly provided in a second direction perpendicular to the first direction and the thickness direction of the electrode assembly.

In an exemplary embodiment, the first and second element lines may be alternately disposed in the first direction.

In an exemplary embodiment, the linear pattern may further include a third element line disposed between the first element line and the second element line and parallel to the first direction.

In an exemplary embodiment, the third element line may be connected to or spaced apart from at least one of the first and second element lines.

In an exemplary embodiment, the third element line may have at least one of a linear shape and a curved shape.

In an exemplary embodiment, each of the first and second element lines may have at least one of a linear shape and a curved shape.

In an exemplary embodiment, the first and second element lines may be connected to or spaced apart from each other.

In an exemplary embodiment, a connection portion of the first and second element lines may have a curved shape.

In an exemplary embodiment, each of the first element line and the second element line may be provided in plural, and an angle between adjacent first and second element lines may be different from an angle between another adjacent first and second element lines.

In an exemplary embodiment, the linear patterns may be defined in at least a part of the exterior package.

In an exemplary embodiment, the linear patterns may extend to opposite edges of the exterior package.

In an exemplary embodiment, the linear patterns may have an identical shape or different shapes.

In an exemplary embodiment, at least one of the linear patterns may have a different shape from another of the linear patterns.

In an exemplary embodiment, intervals between the linear patterns may be identical to or different from each other.

In an exemplary embodiment, an interval between two adjacent linear patterns may be different from an interval between other two adjacent linear patterns.

In an exemplary embodiment, the exterior package may further include an additional pattern disposed between the linear patterns.

In an exemplary embodiment, the exterior package may further include an additional pattern disposed to cross the linear patterns.

In an exemplary embodiment, the exterior package may further include a gas barrier layer including the linear patterns.

In an exemplary embodiment, the exterior package may further include an adhesive layer disposed on the gas barrier layer.

In an exemplary embodiment, the exterior package may further include a first package disposed to cover an upper surface of the electrode assembly, and a second package bonded to the first package to cover a lower surface of the electrode assembly.

In an exemplary embodiment, the first package may include the linear patterns.

In an exemplary embodiment, the second package may include the linear patterns.

According to another exemplary embodiment, an electrochemical device includes an electrode assembly, and an exterior package which surrounds the electrode assembly, where the exterior package includes a plurality of linear patterns, each of the linear patterns has a cross-section of an uneven structure in a thickness direction of the electrode assembly and a linear patter of the linear patterns includes a first element line and a second element line, which extend in different directions on a plane perpendicular to the thickness direction of the electrode assembly.

In an exemplary embodiment, the first and second element lines may be inclined with respect to a first direction perpendicular to the thickness direction of the electrode assembly.

In an exemplary embodiment, the linear patterns may be repeatedly disposed in a second direction perpendicular to the first direction.

In an exemplary embodiment, a third element line may be provided between the at least one first element line and the at least one second element line and parallel to the first direction.

In an exemplary embodiment, the linear patterns may extend to opposite edges of the electrode assembly.

In an exemplary embodiment, the exterior package may further include an additional pattern disposed between the linear patterns.

In an exemplary embodiment, the exterior package may further include a gas barrier layer including the linear patterns.

In an exemplary embodiment, the exterior package may further include a first package disposed to cover an upper surface of the electrode assembly and a second package bonded to the first package to cover a lower surface of the electrode assembly.

In an exemplary embodiment, the first package may include the linear patterns.

In an exemplary embodiment, the second package may include the linear patterns.

BRIEF DESCRIPTION OF THE DRAWINGS

These and/or other features will become apparent and more readily appreciated from the following description of the exemplary embodiments, taken in conjunction with the accompanying drawings, in which.

DETAILED DESCRIPTION

Figure 1A:
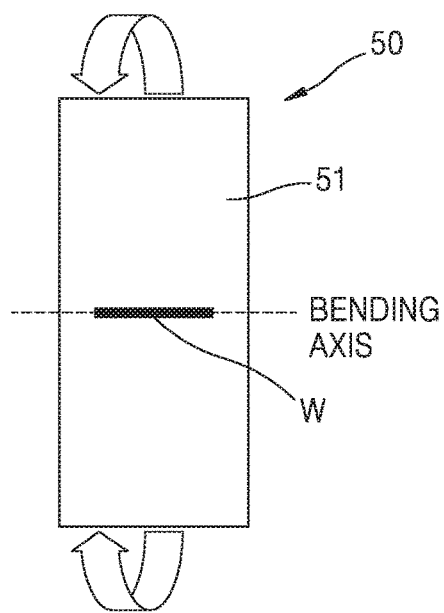
FIG. 1A illustrates bending of a general electrochemical device.

Reference will now be made in detail to exemplary embodiments, examples of which are illustrated in the accompanying drawings, wherein like reference numerals refer to like elements throughout. Also, the size of each layer illustrated in the drawings may be exaggerated for convenience of explanation and clarity. In this regard, the embodiments may have different forms and should not be construed as being limited to the descriptions set forth herein. Accordingly, the embodiments are merely described below, by referring to the figures, to explain aspects of the description.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments will be described in detail with reference to the accompanying drawings.

Figure 1B:
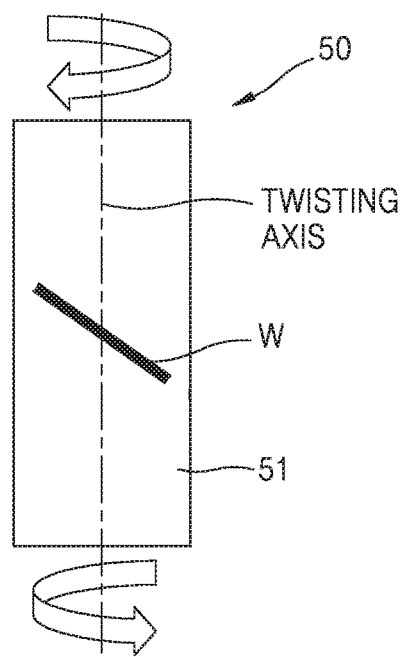
FIGS. 1B and 1C illustrate twisting of a general electrochemical device.
Figure 1C:
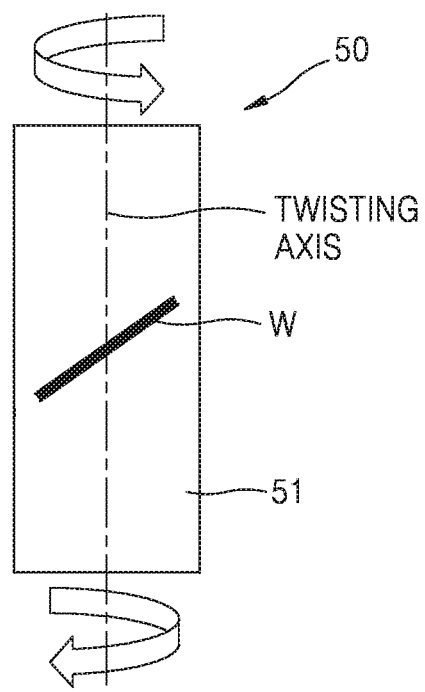

FIG. 1A illustrates bending of a conventional electrochemical device 50. FIGS. 1B and 1C illustrate twisting of the conventional electrochemical device 50.

The electrochemical device 50 may include an electrode assembly (not shown) and an exterior package 51 for sealing and packaging the electrode assembly. When the electrochemical device 50 is bent as illustrated in FIG. 1A, a wrinkle W may be generated on the exterior package 51 in a direction parallel to a bending axis. When the electrochemical device 50 is twisted as illustrated in FIG. 1B or 1C, a wrinkle W may be generated on the exterior package 51 in a direction inclined by a predetermined angle with respect to a twisting axis. Accordingly, when the electrochemical device 50 is repeatedly bent or twisted, a pin hole may be formed in the exterior package 51 or the exterior package 51 may be damaged due to the generation of the wrinkle W.

Figure 2:
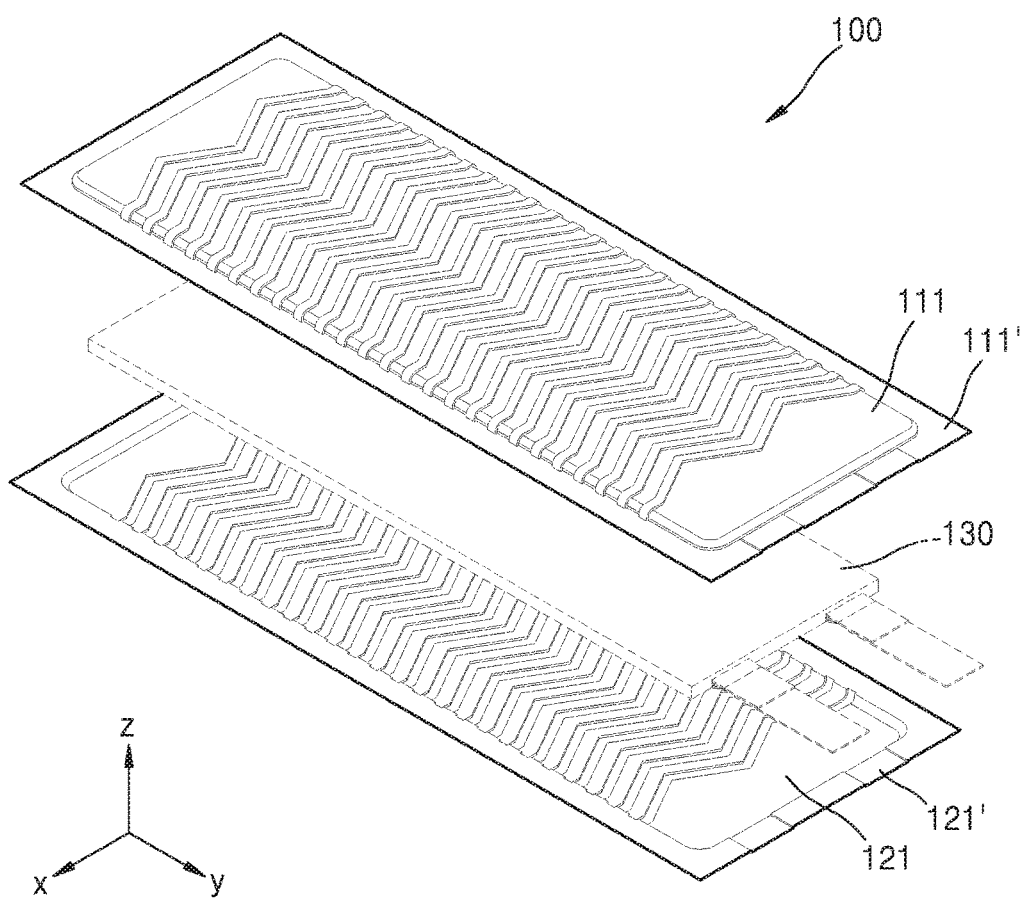
FIG. 2 is an exploded perspective view of an exterior package for an electrochemical device according to an exemplary embodiment.

FIG. 2 is an exploded perspective view of an exterior package for an electrochemical device according to an exemplary embodiment.

Referring to FIG. 2, an exemplary embodiment of an exterior package 100 for packaging and sealing an electrode assembly 130 may include first and second packages 111 and 121 facing each other. The first package 111 may be provided to cover an upper surface of the electrode assembly 130, and the second package 121 may be provided to cover a lower surface of the electrode assembly 130. The electrode assembly 130 that is disposed between or inserted into the first and second packages 111 and 121 may have flexibility. However, the disclosure is not limited thereto.

In an exemplary embodiment, each of the first and second packages 111 and 121 may include a gas barrier layer (not shown). The gas barrier layer may effectively prevent intrusion of external moisture or oxygen and leakage or volatilization of an electrolyte. In an exemplary embodiment, the gas barrier layer may include, for example, a metal, an inorganic substance, or a polymer. In such an embodiment, the inorganic substance may include, for example, a plurality of plate-like particles such as graphene particles or clay particles, but not being limited thereto. In such an embodiment, the polymer may include, for example, polyvinylidene chloride ("PVDC"), ethylene vinyl alcohol ("EVOH"), polyketone, liquid crystal polymer ("LCP"), or fluoropolymer.

In an exemplary embodiment, each of the first and second packages 111 and 121 may further include another layer on the gas barrier layer. In one exemplary embodiment, for example, each of the first and second packages 111 and 121 may further include a protection layer (not shown) or an insulating layer (not shown) on the gas barrier layer. In such an embodiment, adhesive layers 111' and 121' may be provided on an inner surface of each of the first and second packages 111 and 121. The electrode assembly 130 may be sealed as the adhesive layers 111' and 121' are bonded to each other.

The first and second packages 111 and 121 may be disposed to face each other. The electrode assembly 130 is disposed or inserted between the first and second packages 111 and 121, and an electrolyte (not shown) is filled between the first and second packages 111 and 121. Then, as the first and second packages 111 and 121 are bonded to each other using the adhesive layers 111' and 121', the electrode assembly 130 may be sealed.

In such an embodiment, the first and second packages 111 and 121 are the same as each other, and the first package 111 will hereinafter be described in detail, for convenience of description. In FIG. 2, an x-direction indicates a widthwise direction of the electrode assembly 130, a y-direction indicates a lengthwise direction of the electrode assembly 130, and a z-direction indicates a thickness direction of the electrode assembly 130.

Figure 3:
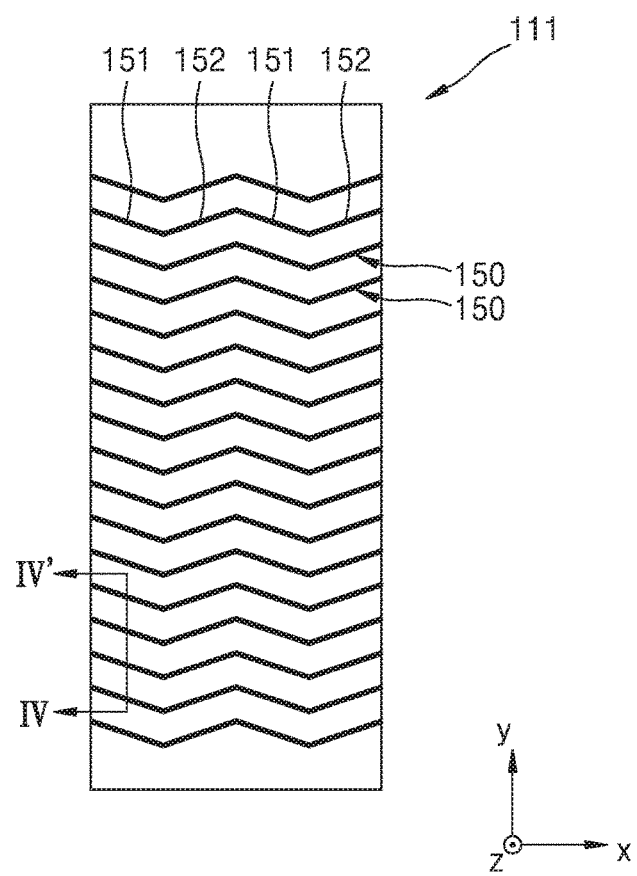
FIG. 3 is a plan view of an exemplary embodiment of a first package of FIG. 2.

FIG. 3 is a plan view of an exemplary embodiment of the first package of FIG. 2.

Referring to FIG. 3, in an exemplary embodiment, a plurality of linear patterns 150 are defined or formed on the first package 111. The linear patterns 150 are repeatedly defined or formed at a predetermined interval in the lengthwise direction of the electrode assembly 130, e.g., in the y-direction. As described below, each of the linear patterns 150 may include a plurality of first and second element lines 151 and 152 which extend in different directions from each other. The linear patterns 150 may extend to the opposite edges of the first package 111 in the widthwise direction of the electrode assembly 130 or in the x-direction.

Figure 4:
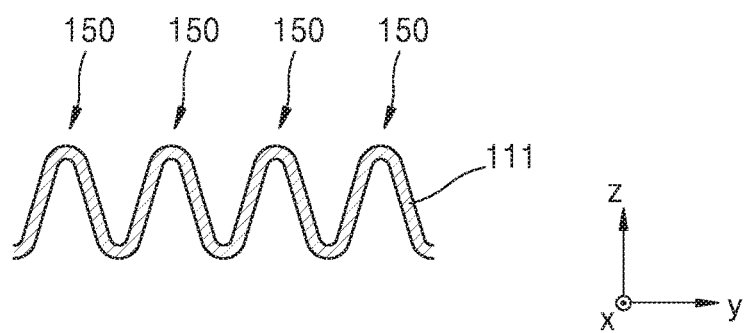
FIG. 4 is a cross-sectional view taken along line IV-IV' of FIG. 3.

FIG. 4 is a cross-sectional view taken along line IV-IV' of FIG. 3.

Referring to FIG. 4, each of the linear patterns 150 may have a cross-section of an uneven shape in the thickness direction of the electrode assembly 130 or in the z-direction. An uneven structure is repeatedly defined or formed on the first package 111 in the lengthwise direction of the electrode assembly 130 or in the y-direction. FIG. 4 illustrates an exemplary embodiment where the uneven structure has a curved shape. However, the disclosure is not limited thereto.

Figure 5A:
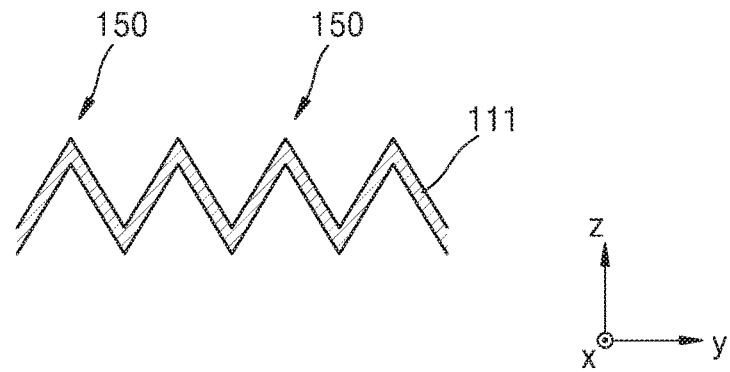
FIGS. 5A and 5B illustrate alternative exemplary embodiments of an uneven structure illustrated in FIG. 4.
Figure 5B:
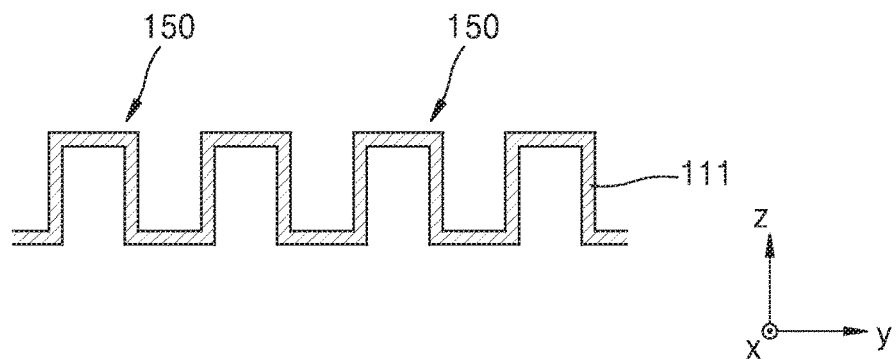

FIGS. 5A and 5B illustrate alternative exemplary embodiments of the uneven structure illustrated in FIG. 4.

In an alternative exemplary embodiment, as shown in FIG. 5A, the uneven structure defined or formed on the first package 111 has a triangular shape. In another alternative exemplary embodiment, as shown in FIG. 5B, the uneven structure defined or formed on the first package 111 has a rectangular shape. The uneven structures illustrated in FIGS. 5A and 5B are merely exemplary, and other uneven structure having various shapes may be defined or formed on the first package 111.

Figure 6:
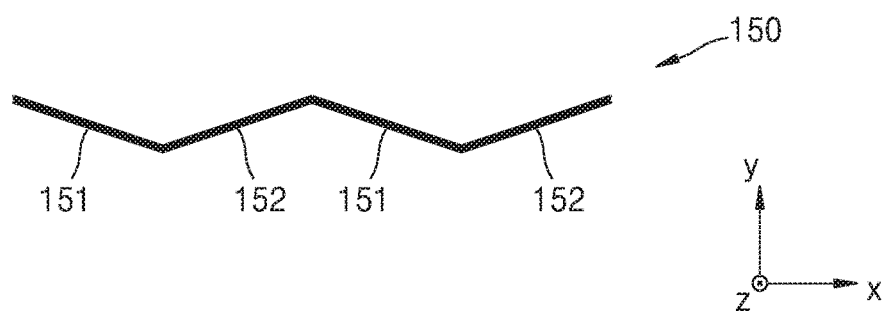
FIG. 6 illustrates an exemplary embodiment of a linear pattern illustrated in FIG. 3.

FIG. 6 illustrates a linear pattern illustrated in FIG. 3. In FIG. 6, only one of the linear patterns 150 defined on the first package 111 is shown.

Referring to FIG. 6, in an exemplary embodiment, the linear pattern 150 may have, for example, a W-like shape. In such an embodiment, the linear pattern 150 may include the two first element lines 151 and the two second element lines 152 in different directions on a plane, e.g., an x-y plane, to be perpendicular to the thickness direction of the electrode assembly 130. The first and second element lines 151 and 152 may be inclined at an angle with respect to a first direction perpendicular to the thickness direction of the electrode assembly 130, for example, the widthwise direction of the electrode assembly 130 or the x-direction. Each of the first and second element lines 151 and 152 has a linear shape and may be alternately arranged in the first direction, for example, in the widthwise direction of the electrode assembly 130 or the x-direction. The first and second element lines 151 and 152 may have the same length and may be arranged symmetrically with respect to the lengthwise direction of the electrode assembly 130 or the y-direction. The first and second element lines 151 and 152 are connected to each other, and the first and second element lines 151 and 152 are connected in a linear shape at a connection portion.

In such an embodiment, as described above, the linear patterns 150, each having a cross-section of an uneven structure, are defined or formed on the first package 111, and each of the linear patterns 150 includes the first and second element lines 151 and 152 in different directions on a plane perpendicular to the thickness direction of the electrode assembly 130. The first and second element lines 151 and 152 may be inclined with respect to the first direction that is perpendicular to the thickness direction of the electrode assembly 130, for example, the widthwise direction of the electrode assembly 130 or the x-direction. The linear patterns 150 may be repeatedly arranged with a predetermined interval in a second direction that is perpendicular to the thickness direction of the electrode assembly 130, for example, the lengthwise direction of the electrode assembly 130 or the y-direction. The first package 111 where the linear patterns 150 having the uneven structure is defined may be manufactured by forming the linear patterns 150 on a flat material through molding.

In such an embodiment, where each of the linear patterns 150 having a cross-section of an uneven structure defined on the first package 111 includes the first and second element lines 151 and 152, and the first element lines 151 and the second element lines 152 are in different directions, formation of a wrinkle that may be generated in the external package due to deformation such as bending or twisting of the electrochemical device may be prevented. Accordingly, when an electrochemical device is manufactured using the exterior package 100 including the linear patterns 150, even when bending deformation and/or twisting deformation are repeatedly applied to the electrochemical device, the generation of a wrinkle in the exterior package 100 is effectively restricted and thus the generation of a pinhole in the exterior package 100 or damage to the exterior package 100 may be effectively prevented.

Figure 7A:
FIGS. 7A to 7C illustrate linear patterns according to exemplary embodiments.
Figure 7B:
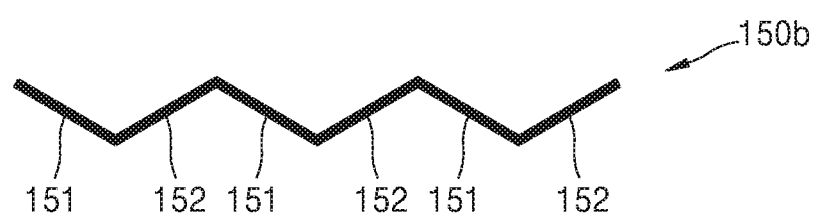
Figure 7C:
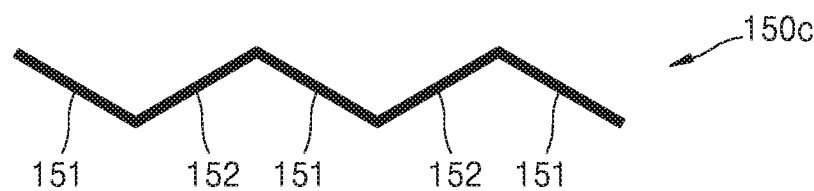

FIGS. 7A to 7C illustrate linear patterns according to exemplary embodiments.

Referring to FIG. 7A, in an exemplary embodiment, a linear pattern 150a may have a "V-like" shape. In such an embodiment, the linear pattern 150a may include the first and second element lines 151 and 152 in different directions on a plane perpendicular to the thickness direction of the electrode assembly 130. Each of the first and second element lines 151 and 152 may be inclined at a predetermined angle with respect to the first direction that is perpendicular to the thickness direction of the electrode assembly 130. The first and second element lines 151 and 152 may be connected to each other, and may be connected in a linear shape at a connection portion.

Referring to FIG. 7B, in an alternative exemplary embodiment, a linear pattern 150b may have a "WV-like" shape. In such an embodiment, the linear pattern 150b may include the three first element lines 151 and the three second element lines 152, and the first element lines 151 and the second element lines 152 are in different directions on a plane perpendicular to the thickness direction of the electrode assembly 130. Each of the first and second element lines 151 and 152 may be inclined at a predetermined angle with respect to the first direction that is perpendicular to the thickness direction of the electrode assembly 130. The first and second element lines 151 and 152 may be alternately arranged in the first direction. The first and second element lines 151 and 152 may be connected to each other, and may be connected in a linear shape at connection portions.

Referring to FIG. 7C, in another alternative exemplary embodiment, a linear pattern 150c may include the three first element lines 151 and the two second element lines 152, and the first element lines 151 and the second element lines 152 are in different directions on a plane perpendicular to the thickness direction of the electrode assembly 130. Each of the first and second element lines 151 and 152 may be inclined at a predetermined angle with respect to the first direction that is perpendicular to the thickness direction of the electrode assembly 130. The first and second element lines 151 and 152 may be alternately arranged in the first direction. The first and second element lines 151 and 152 may be connected to each other, and may be connected in a linear shape at connection portions.

Figure 8A:
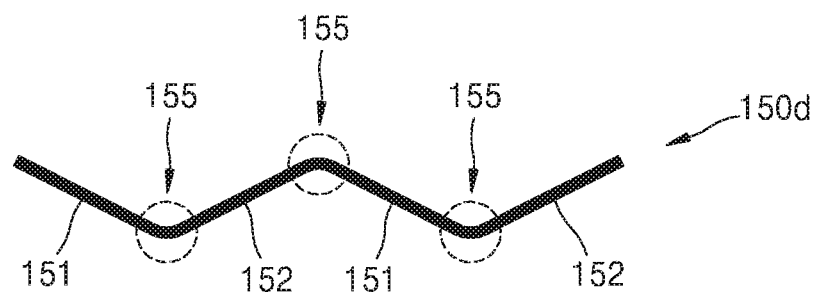
FIGS. 8A and 8B illustrate linear patterns according to alternative exemplary embodiments.
Figure 8B:
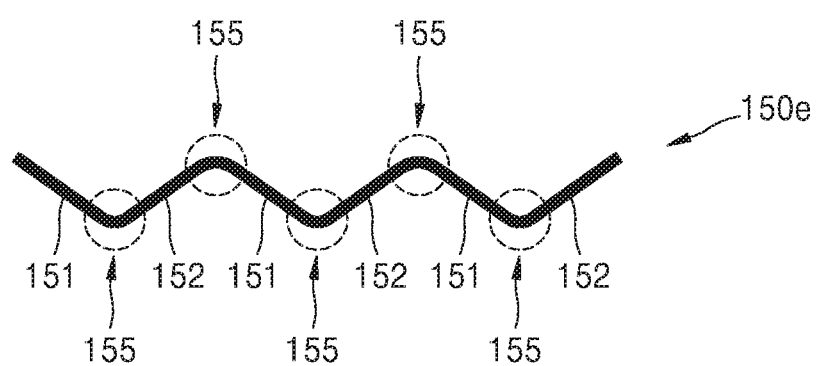

FIGS. 8A and 8B illustrate linear patterns according to alternative exemplary embodiments.

Referring to FIG. 8A, in an exemplary embodiment, a linear pattern 150d may have a W-like shape. In such an embodiment, the linear pattern 150d may include the two first element lines 151 and two second element lines 152, and the first element lines 151 and the second element lines 152 are in different directions on a plane perpendicular to the thickness direction of the electrode assembly 130. The first and second element lines 151 and 152 may be inclined at a predetermined angle with respect to the first direction that is perpendicular to the thickness direction of the electrode assembly 130. The first and second element lines 151 and 152 may be alternately arranged in the first direction. The first and second element lines 151 and 152 may be connected to each other, and may be connected in a curved shape at connection portions 155.

Referring to FIG. 8B, in an alternative exemplary embodiment, a linear pattern 150e may have a "WV-like" shape. In such an embodiment, the linear pattern 150e may include the three first element lines 151 and the three second element lines 152, and the first element lines 151 and the second element lines 152 are in different directions on a plane perpendicular to the thickness direction of the electrode assembly 130. The first and second element lines 151 and 152 may be inclined at a predetermined angle with respect to the first direction that is perpendicular to the thickness direction of the electrode assembly 130. The first and second element lines 151 and 152 may be alternately arranged in the first direction. The first and second element lines 151 and 152 may be connected to each other, and may be connected in a curved shape at the connection portions 155.

Figure 9A:
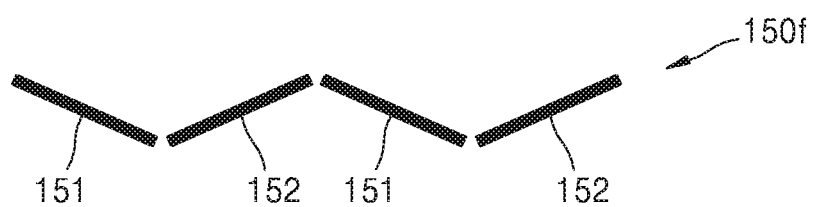
FIGS. 9A and 9B illustrate linear patterns according to other alternative exemplary embodiments.
Figure 9B:
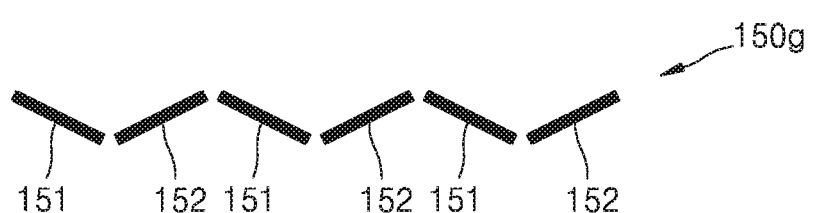

FIGS. 9A and 9B illustrate linear patterns according to other alternative exemplary embodiments.

Referring to FIG. 9A, in an exemplary embodiment, a linear pattern 150f may have a "W-like" shape. In such an embodiment, the linear pattern 150f may include the two first element lines 151 and the two second element lines 152 formed in different directions on a plane perpendicular to the thickness direction of the electrode assembly 130. The first and second element lines 151 and 152 may be inclined at a predetermined angle with respect to the first direction that is perpendicular to the thickness direction of the electrode assembly 130. The first and second element lines 151 and 152 may be alternately arranged in the first direction. The first and second element lines 151 and 152 may be arranged spaced apart from each other at a predetermined interval.

Referring to FIG. 9B, in an alternative exemplary embodiment, a linear pattern 150g may have a "WV-like" shape. In such an embodiment, the linear pattern 150g may include the three first element lines 151 and the three second element lines 152, and the first element lines 151 and the second element lines 152 are in different directions on a plane perpendicular to the thickness direction of the electrode assembly 130. The first and second element lines 151 and 152 may be inclined at a predetermined angle with respect to the first direction that is perpendicular to the thickness direction of the electrode assembly 130. The first and second element lines 151 and 152 may be alternately arranged in the first direction. The first and second element lines 151 and 152 may be arranged spaced apart from each other at a predetermined interval.

Figure 10A:
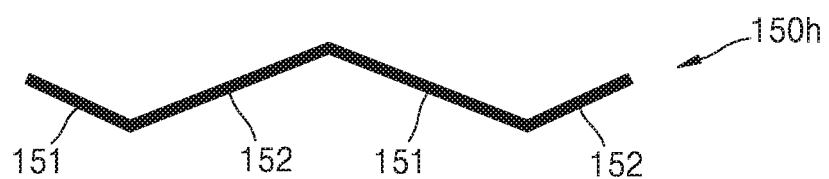
FIGS. 10A to 10C illustrate linear patterns according to other alternative exemplary embodiments.
Figure 10B:
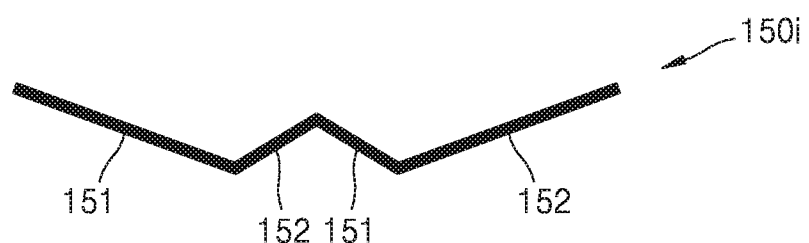
Figure 10C:
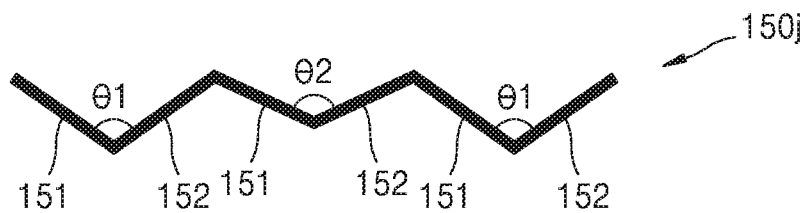

FIGS. 10A to 10C illustrate linear patterns according to other alternative exemplary embodiments.

Referring to FIGS. 10A and 10B, in an exemplary embodiment, each of linear patterns 150h and 150i may have a "W-like" shape. In such an embodiment, the linear pattern 150f may include the two first element lines 151 and the two second element lines 152, and the first element lines 151 and the second element lines 152 are in different directions on a plane perpendicular to the thickness direction of the electrode assembly 130. The first and second element lines 151 and 152 may be inclined at a predetermined angle with respect to the first direction that is perpendicular to the thickness direction of the electrode assembly 130. The first and second element lines 151 and 152 may be alternately arranged in the first direction. At least one of the first and second element lines 151 and 152 may have a different length from another of the first and second element lines 151 and 152.

Referring to FIG. 10C, in an alternative exemplary embodiment, a linear pattern 150j may have a "WV-like" shape. In such an embodiment, the linear pattern 150b may include the three first element lines 151 and the three second element lines 152, and the first element lines 151 and the second element lines 152 are in different directions on a plane perpendicular to the thickness direction of the electrode assembly 130. The first and second element lines 151 and 152 may be inclined at a predetermined angle with respect to the first direction that is perpendicular to the thickness direction of the electrode assembly 130. The first and second element lines 151 and 152 may be alternately arranged in the first direction. At least one of the first and second element lines 151 and 152 may have a different inclination. In one exemplary embodiment, for example, in-between angles $\theta 1$ of the first and second element lines 151 and 152 located at opposite side portions of the linear pattern 150j may be different from an in-between angle $\theta 2$ of the first and second element lines 151 and 152 located at a center portion of the linear pattern 150j.

Figure 11A:
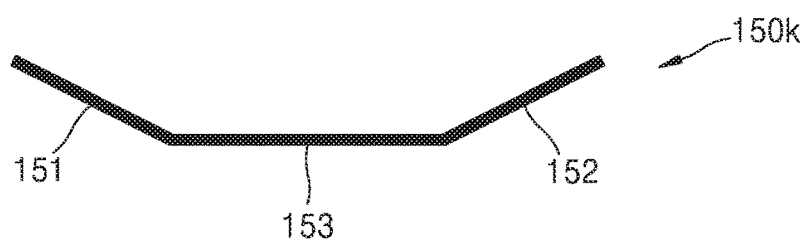
FIGS. 11A to 11C illustrate linear patterns according to other alternative exemplary embodiments.
Figure 11B:
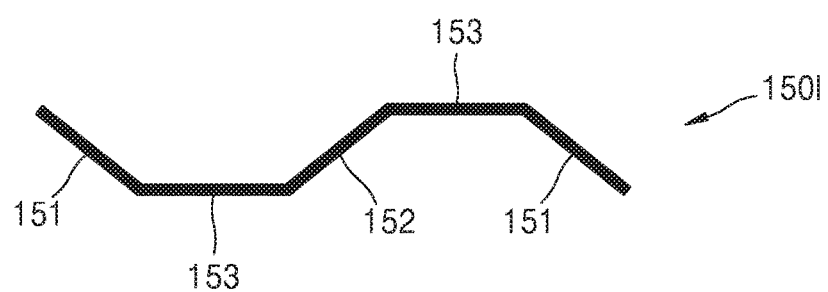
Figure 11C:
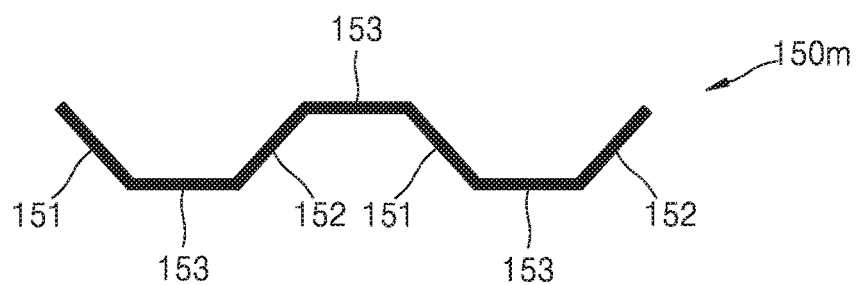

FIGS. 11A to 11C illustrate linear patterns according to other alternative exemplary embodiments.

Referring to FIG. 11A, in an exemplary embodiment, a linear pattern 150k may include the first and second element lines 151 and 152, which extend in different directions on a plane perpendicular to the thickness direction of the electrode assembly 130, and a third element line 153 connecting the first and second element lines 151 and 152. The first and second element lines 151 and 152 may be inclined at a predetermined angle with respect to the first direction that is perpendicular to the thickness direction of the electrode assembly 130. The third element line 153 connecting the first element line 151 and the second element line 152 may be parallel to the first direction. The third element line 153 may have a linear shape. In an exemplary embodiment, as shown in FIG. 11A, the third element line 153 may be connected to the first and second element lines 151 and 152, but not being limited thereto. Alternatively, the third element line 153 may be disposed between the first and second element lines 151 and 152, and spaced apart from the first and second element lines 151 and 152.

Referring to FIG. 11B, in an alternative exemplary embodiment, a linear pattern 150l may include the two first element lines 151 and the second element line 152, which are in different directions on a plane perpendicular to the thickness direction of the electrode assembly 130, and the two third element lines 153 connecting the first element lines 151 and the second element line 152. The first and second element lines 151 and 152 may be inclined at a predetermined angle with respect to the first direction that is perpendicular to the thickness direction of the electrode assembly 130. The third elements lines 153 that connect the first element lines 151 and the second element line 152 may be parallel to the first direction. The third element lines 153 may have a linear shape. In an exemplary embodiment, as shown in FIG. 11B, the third element line 153 may be connected to the first and second element lines 151 and 152, but not being limited thereto. Alternatively, the third element lines 153 may be disposed between the first and second element lines 151 and 152, and spaced apart from the first and second element lines 151 and 152.

Referring to FIG. 11C, in another alternative exemplary embodiment, a linear pattern 150m may include the two first element lines 151 and the two second element lines 152, which extend in different directions on a plane perpendicular to the thickness direction of the electrode assembly 130, and the three third element lines 153 connecting the first element lines 151 and the second element lines 152. The first and second element lines 151 and 152 may be inclined at a predetermined angle with respect to the first direction that is perpendicular to the thickness direction of the electrode assembly 130. The third elements lines 153 that connect the first element lines 151 and the second element lines 152 may be parallel to the first direction. The third element lines 153 may have a linear shape. In an exemplary embodiment, as shown in FIG. 11C, the third element line 153 may be connected to the first and second element lines 151 and 152, but not being limited thereto. Alternatively, the third element lines 153 may be disposed between the first and second element lines 151 and 152, and spaced apart from the first and second element lines 151 and 152.

Figure 12A:
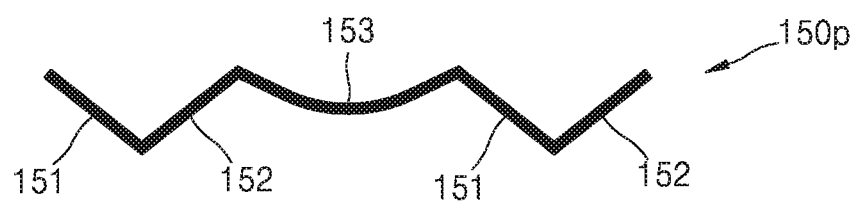
FIGS. 12A and 12B illustrate linear patterns according to other alternative exemplary embodiments.
Figure 12B:
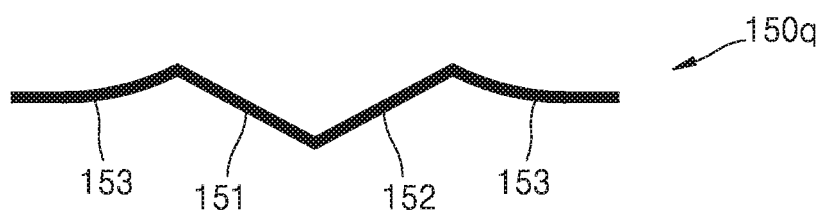

FIGS. 12A and 12B illustrate linear patterns according to other alternative exemplary embodiments.

Referring to FIG. 12A, in an exemplary embodiment, a linear pattern 150p may include the two first element lines 151 and the two second element lines 152, which extend in different directions on a plane perpendicular to the thickness direction of the electrode assembly 130, and the third element line 153 connecting the first element lines 151 and the second element lines 152. The first and second element lines 151 and 152 may be located at the opposite side portions of the linear pattern 150p and the third element line 153 that connects the first element line 151 and the second element line 152 is located at the center portion of the linear pattern 150p. The third elements lines 153 may have a curved shape. In an exemplary embodiment, as shown in FIG. 12A, the third element line 153 may be connected to the first and second element lines 151 and 152, but not being limited thereto. Alternatively, the third element line 153 may be disposed between the first and second element lines 151 and 152, and spaced apart from the first and second element lines 151 and 152.

Referring to FIG. 12B, in an alternative exemplary embodiment, a linear pattern 150q may include the first element line 151 and the second element line 152, which extend in different directions on a plane perpendicular to the thickness direction of the electrode assembly 130, and the two third element lines 153 connecting the first element line 151 and the second element line 152. The first and second element lines 151 and 152 may be located at the center portion of the linear pattern 150q and the third element lines 153 are located at the opposite side portions of the linear pattern 150q. The third elements lines 153 may have a curved shape. In an exemplary embodiment, as shown in FIG. 12B, the third element line 153 may be connected to the first and second element lines 151 and 152, but not being limited thereto. Alternatively, the third element lines 153 may be disposed between the first and second element lines 151 and 152, and spaced apart from the first and second element lines 151 and 152. The above-described linear patterns are merely exemplary, and other linear patterns having various shapes may be defined in the exterior package.

FIGS. 13 to 20 are plan views of exterior packages according to alternative exemplary embodiments. FIGS. 13 to 20 exemplarily illustrate only the first package 112 of the exterior package 100, for convenience of illustration.

Figure 13:
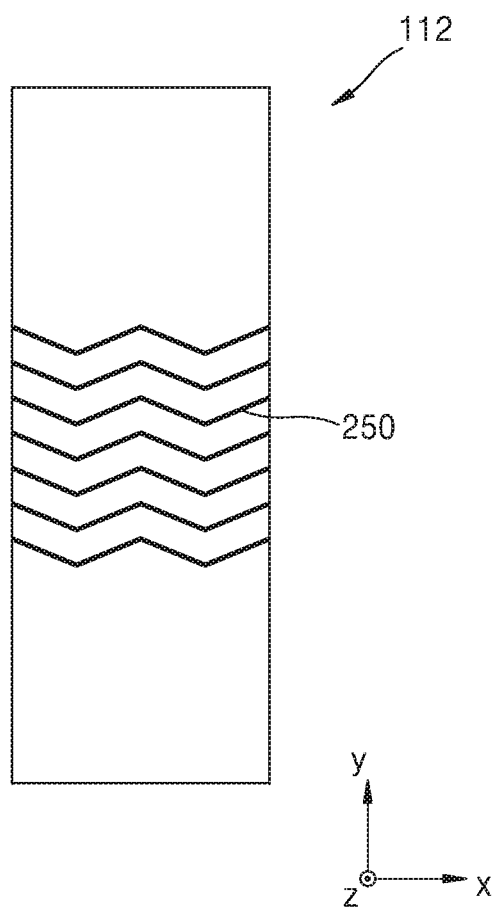
FIGS. 13 to 20 are plan views of exterior packages according to alternative exemplary embodiments.

Referring to FIG. 13, in an exemplary embodiment, a plurality of linear patters 250, each having a cross-section of an uneven structure, are defined on the first package 112, and each of the linear patterns 250 may include a plurality of first and second element lines in different directions on a plane perpendicular to the thickness direction of the electrode assembly 130 or a x-y plane, as described above. The first and second element lines may be inclined with respect to the first direction that is perpendicular to the thickness direction of the electrode assembly 130, for example, the widthwise direction of the electrode assembly 130 or the x-direction. In such an embodiment, as shown in FIG. 13, the linear patterns 250 have a "W-like" shape, but note being limited thereto. Alternatively, the linear patterns 250 having different shapes may be defined on the first package 112. The linear patterns 250 may be repeatedly arranged at a predetermined interval in the second direction perpendicular to the thickness direction of the electrode assembly 130, for example, the lengthwise direction of the electrode assembly 130 or the y-direction. The linear patterns 250 may be defined only on a part of the first package 112. In one exemplary embodiment, for example, the linear patterns 250 may be defined only on a center portion of the first package 112 in the lengthwise direction of the electrode assembly 130.

Figure 14:
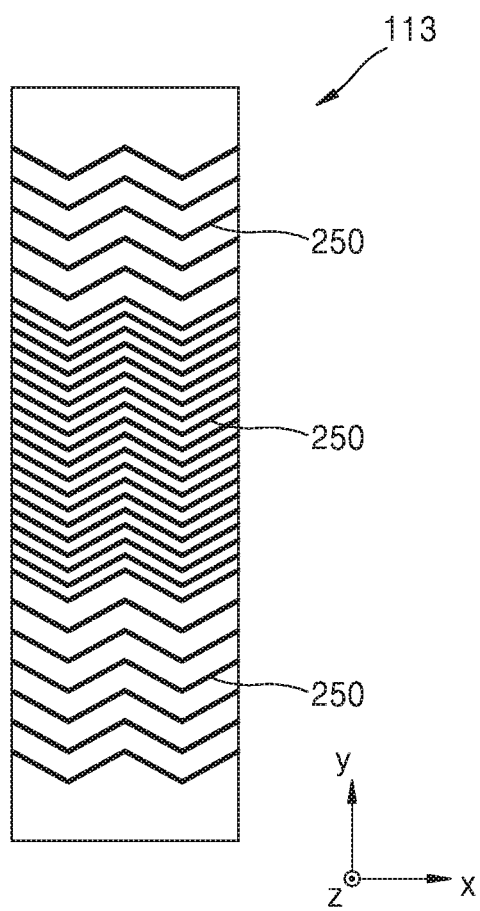

Referring to FIG. 14, in an alternative exemplary embodiment, the linear patterns 250, each having a cross-section of an uneven structure, are defined on a first package 113, and each of the linear patterns 250 may include a plurality of first and second element lines in different directions on a plane perpendicular to the thickness direction of the electrode assembly 130, as described above. The first and second element lines may be inclined with respect to the first direction that is perpendicular to the thickness direction of the electrode assembly 130. In such an embodiment, as shown in FIG. 14, the linear patterns 250 have a "W-like" shape, but not being limited thereto. Alternatively, the linear patterns 250 having different shapes may be defined on the first package 113.

The linear patterns 250 may be repeatedly arranged in the second direction perpendicular to the thickness direction of the electrode assembly 130. An interval between some of the linear patterns 250 may be different from an interval between other linear patterns 250. In an exemplary embodiment, as shown in FIG. 14, in the lengthwise direction of the electrode assembly 130 or the y-direction, an interval between the linear patterns 250 arranged at the center of the first package 113 may be smaller than an interval between the linear patterns 250 arranged in the upper and lower portions of the first package 113.

Figure 15:
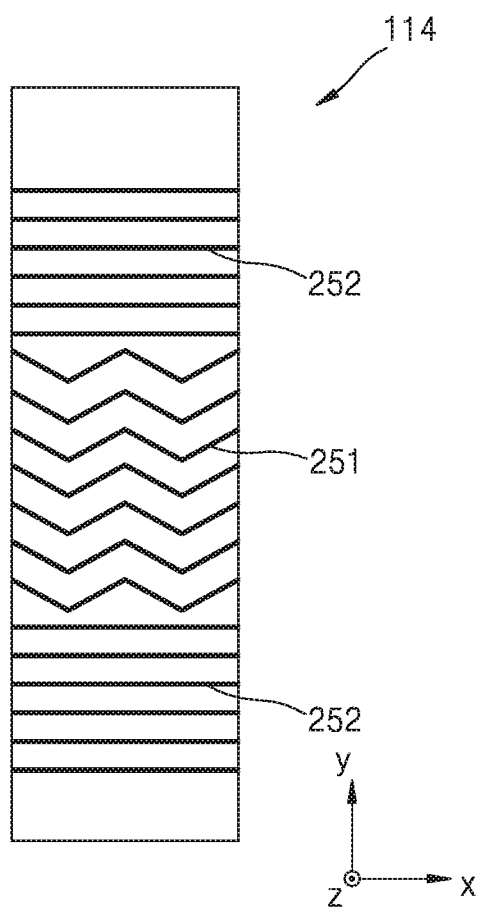

Referring to FIG. 15, in an exemplary embodiment, a plurality of first linear patterns 251 and a plurality of second linear patterns 252, each having a cross-section of an uneven structure, are defined on a first package 114. The first and second linear patterns 251 and 252 may have different shapes from each other. In an exemplary embodiment, as shown in FIG. 15, the first linear patterns 251 having a "W-like" shape are defined at the center portion of the first package 114 in the lengthwise direction of the electrode assembly 130 or the y-direction, and the second linear patterns 252 are defined in the upper and lower portions of the first package 114.

Each of the first linear patterns 251 may include a plurality of first and second element lines, which extend in different directions on a plane perpendicular to the thickness direction of the electrode assembly 130. The first and second element lines may be inclined with respect to the first direction that is perpendicular to the thickness direction of the electrode assembly 130. Each of the second linear patterns 252 may be parallel to the first direction. The shapes of the first and second linear patterns 251 and 252 illustrated in FIG. 15 are merely exemplary, and thus the first and second linear patterns 251 and 252 may be modified to have at least one of various different shapes determined in a way such that the generation of a wrinkle in the exterior package 100 is effectively restricted.

Figure 16:
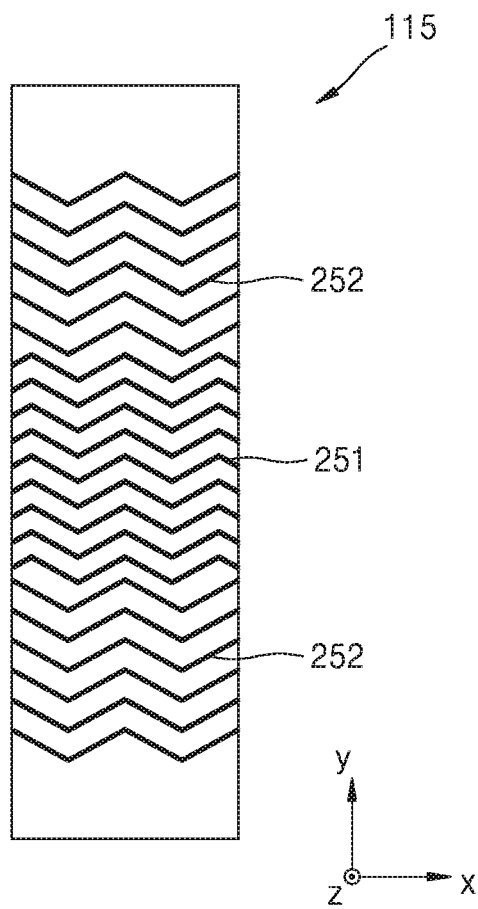

Referring to FIG. 16, in another alternative exemplary embodiment, the first linear patterns 251 and the second linear patterns 252, each having a cross-section of an uneven structure, are defined on a first package 115. The first and second linear patterns 251 and 252 may have different shapes from each other. In an exemplary embodiment, as shown in FIG. 16, the first linear patterns 251 having a "WV-like" shape are defined at the center portion of the first package 115 in the lengthwise direction of the electrode assembly 130 or the y-direction, and the second linear patterns 252 having a "W-like" shape are defined in the upper and lower portions of the first package 115.

Each of the first linear patterns 251 may include a plurality of first and second element lines, which extend in different directions on a plane perpendicular to the thickness direction of the electrode assembly 130. The first and second element lines may be inclined with respect to the first direction that is perpendicular to the thickness direction of the electrode assembly 130. Each of the second linear patterns 252 may include a plurality of first and second element lines, which are in different directions on a plane perpendicular to the thickness direction of the electrode assembly 130. The first and second element lines may be inclined with respect to the first direction that is perpendicular to the thickness direction of the electrode assembly 130. The shapes of the first and second linear patterns 251 and 252 illustrated in FIG. 16 are merely exemplary and thus the first and second linear patterns 251 and 252 may be modified to have at least one of the various different shapes.

Figure 17:
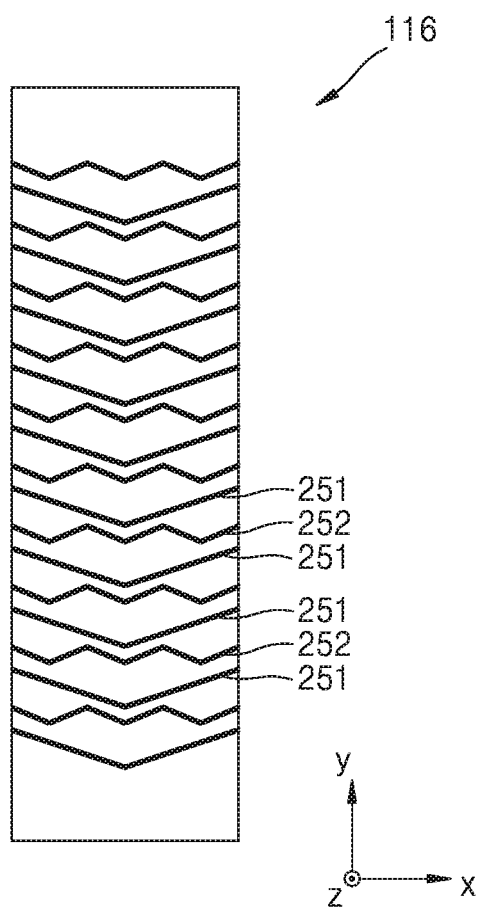

Referring to FIG. 17, in another alternative exemplary embodiment, the first linear patterns 251 and the second linear patterns 252, each having a cross-section of an uneven structure, are defined on a first package 116. The first and second linear patterns 251 and 252 may have different shapes from each other. The first and second linear patterns 251 and 252 may be alternately arranged in the lengthwise direction of the electrode assembly 130 or the y-direction. In an exemplary embodiment, as shown in FIG. 17, the first linear patterns 251 have a "V-like" shape and the second linear patterns 252 have a "WV-like" shape, but not being limited thereto. The shapes of the first and second linear patterns 251 and 252 illustrated in FIG. 17 are merely exemplary and thus the first and second linear patterns 251 and 252 may be modified to have at least one of the various different shapes.

Figure 18:
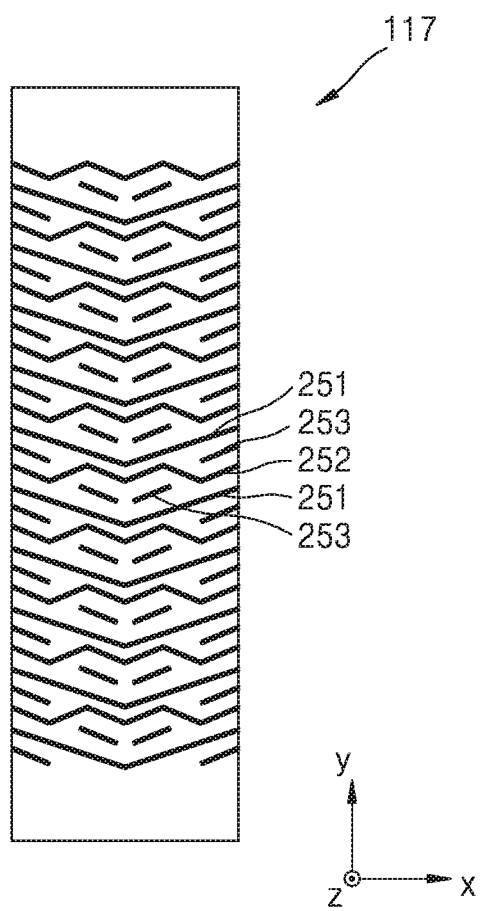

Referring to FIG. 18, in another alternative exemplary embodiment, the first linear patterns 251, the second linear patterns 252, and a plurality of third linear patterns 253, each having a cross-section of an uneven structure, are defined on a first package 117. The first and second linear patterns 251 and 252 may be alternately arranged in the lengthwise direction of the electrode assembly 130 or the y-direction. In an exemplary embodiment, as shown in FIG. 18, the first linear patterns 251 have a "V-like" shape and the second linear patterns 252 have a "WV-like" shape. The shapes of the first and second linear patterns 251 and 252 illustrated in FIG. 18 are exemplary and thus the first and second linear patterns 251 and 252 may be modified to have at least one of the various different shapes. The third linear patterns 253 are disposed between the first patterns 251 and the second patterns 252. Although FIG. 18 illustrates an exemplary embodiment, where the third linear patterns 253 are inclined with respect to the widthwise direction of the electrode assembly 130, this is merely exemplary and the shape and arrangement of the third linear patterns 253 may be modified in various ways such that the generation of a wrinkle in the exterior package 100 is effectively restricted.

Figure 19:
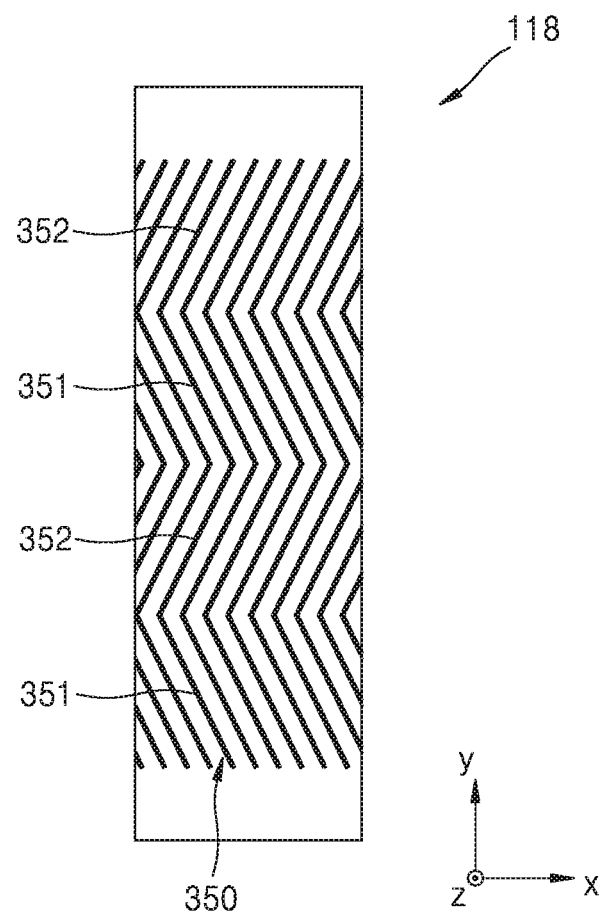

Referring to FIG. 19, in another alternative exemplary embodiment, a plurality of linear patterns 350 are defined on a first package 118. The linear patterns 350 extend substantially in the lengthwise direction of the electrode assembly 130 or the y-direction and are repeatedly arranged at a predetermined interval in the widthwise direction of the electrode assembly 130 or the x-direction. The linear patterns 350 may extend to the opposite edges of the first package 118 in the widthwise direction of the electrode assembly 130 or the x-direction.

Each of the linear patterns 350 may include the first and second element lines 351 and 352, which extend in different directions on a plane perpendicular to the thickness direction of the electrode assembly 130 or the x-y plane. In such an embodiment, the first and second element lines 351 and 352 may be inclined at a predetermined angle with respect to the lengthwise direction of the electrode assembly 130 or the y-direction. The first and second element lines 351 and 352 may be alternately arranged in the lengthwise direction of the electrode assembly 130 or the y-direction. Although FIG. 19 illustrates an exemplary embodiment where the linear patterns 350 have a "W-like" shape of "W", the disclosure is not limited thereto. Alternatively, the linear patterns 350 may be modified to have at least one of the various different shapes.

Figure 20:
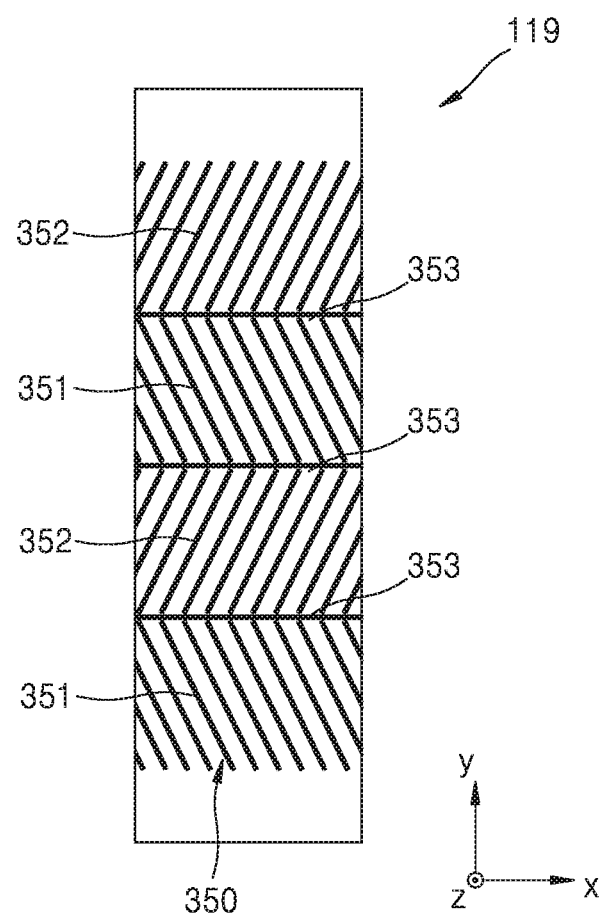

Referring to FIG. 20, in another alternative exemplary embodiment, the first linear patterns 350 and a plurality of second linear patterns 353 are defined on a first package 119. The first the linear patterns 350 extend substantially in the lengthwise direction of the electrode assembly 130 or the y-direction and are repeatedly arranged at a predetermined interval in the widthwise direction of the electrode assembly 130 or the x-direction. Each of the first the linear patterns 350 may include the first and second element lines 351 and 352 which extend in different directions on a plane perpendicular to the thickness direction of the electrode assembly 130 or the x-y plane. In such an embodiment, the first and second element lines 351 and 352 may be inclined at a predetermined angle with respect to the lengthwise direction of the electrode assembly 130 or the y-direction. The first and second element lines 351 and 352 may be alternately arranged in the lengthwise direction of the electrode assembly 130 or the y-direction. Although FIG. 19 illustrates an exemplary embodiment where the first the linear patterns 350 have a "W-like" shape, the disclosure is not limited thereto. Alternatively, the first the linear patterns 350 having at least one of the various different shapes may be defined on the first package 119.

The second linear patterns 353 may be defined to cross the first the linear patterns 350. FIG. 20 illustrates an exemplary embodiment where the second linear patterns 353 are formed to cross connection portions of the first element lines 351 and the second element lines 352. The second linear patterns 353 may be parallel to the widthwise direction of the electrode assembly 130 or the x-direction. However, the disclosure is not limited thereto.

Figure 21:
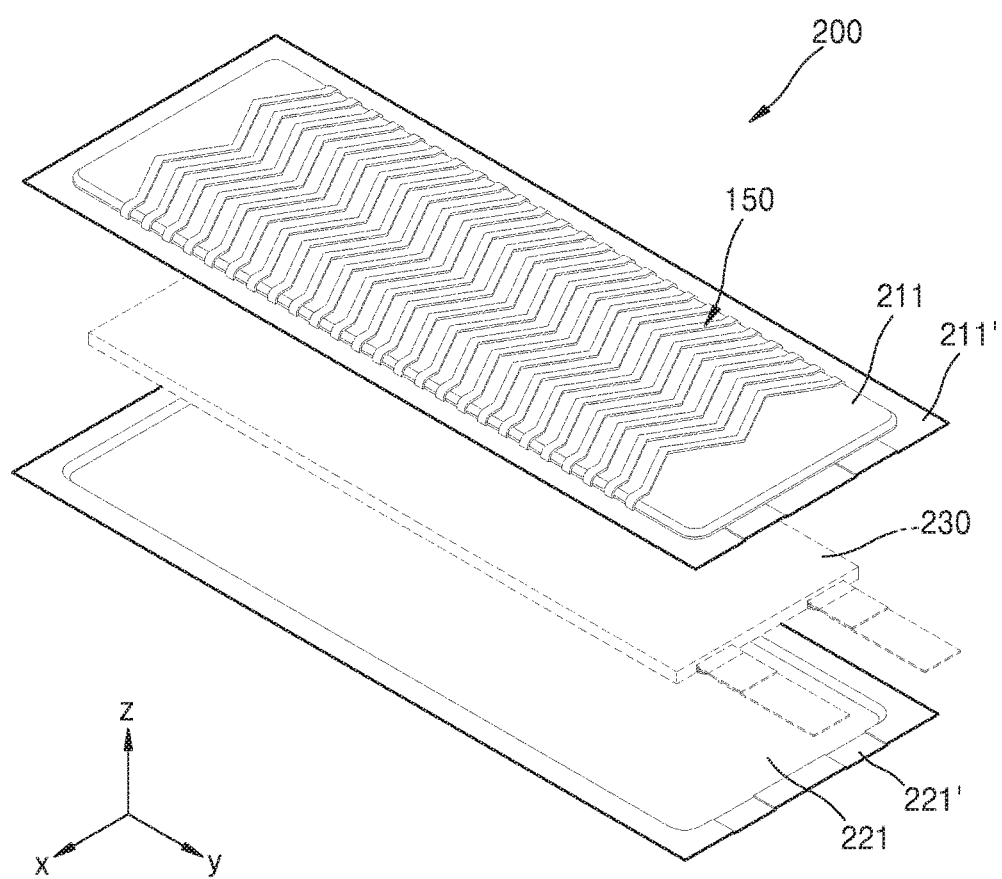
FIG. 21 is a perspective view of an exterior package according to another alternative exemplary embodiment.

FIG. 21 is a perspective view of an exterior package 200 according to an alternative exemplary embodiment.

Referring to FIG. 21, an exemplary embodiment of the exterior package 200 for packaging and sealing an electrode assembly 230 may include first and second packages 211 and 221 facing each other. The first package 211 may be disposed to cover an upper surface of the electrode assembly 230, and the second package 221 may be disposed to cover a lower surface of the electrode assembly 230. The electrode assembly 230 that is disposed between or inserted into the first and second packages 211 and 221 may have flexibility. However, the disclosure is not limited thereto. In such an embodiment, adhesive layers 211' and 221' may be provided on inner surfaces of the first and second packages 211 and 221, respectively.

The linear patterns 150, each having a cross-section of an uneven structure, are defined on the first package 211. The linear patterns 150 may be repeatedly arranged at a predetermined interval in the lengthwise direction of the electrode assembly 230 or the y-direction. Each of the linear patterns 150 may include a plurality of first and second element lines, which extend in different directions. The linear patterns 150 may extend to the opposite edges of the first package 211 in a widthwise direction of the electrode assembly 230 or the x-direction. In such an embodiment, the linear patterns 150 are substantially the same as one of the exemplary embodiments of the linear patterns described above, and any repetitive detailed description thereof will be omitted. The linear patterns 150 formed on the first package 211 illustrated in FIG. 21 are merely exemplary and thus other linear patterns having at least one of the various different shapes may be defined on the first package 211.

The second package 221 may be disposed to face the first package 211. In an exemplary embodiment, as shown in FIG. 21, the second package 221 may have a shape that is different from the shape of the first package 211 or a flat shape. In such an embodiment, the linear patterns 150 that are defined on the first package 211 may not be defined on the second package 221.

In such an embodiment, the electrode assembly 230 is disposed or inserted between the first package 211 and the second package 221. After an electrolyte is filled between the first and second packages 211 and 221, the first package 211 and the second package 221 are bonded to each other using the adhesive layers 211' and 221', thereby manufacturing an electrochemical device. Although the exemplary embodiment, where linear patterns are not formed on the second package 221, is described above in detail, the disclosure is not limited thereto. Alternatively, other linear patterns having a different shape from the shape of the linear patterns 150 on the first package 211 may be defined on the second package 221.

Figure 22:
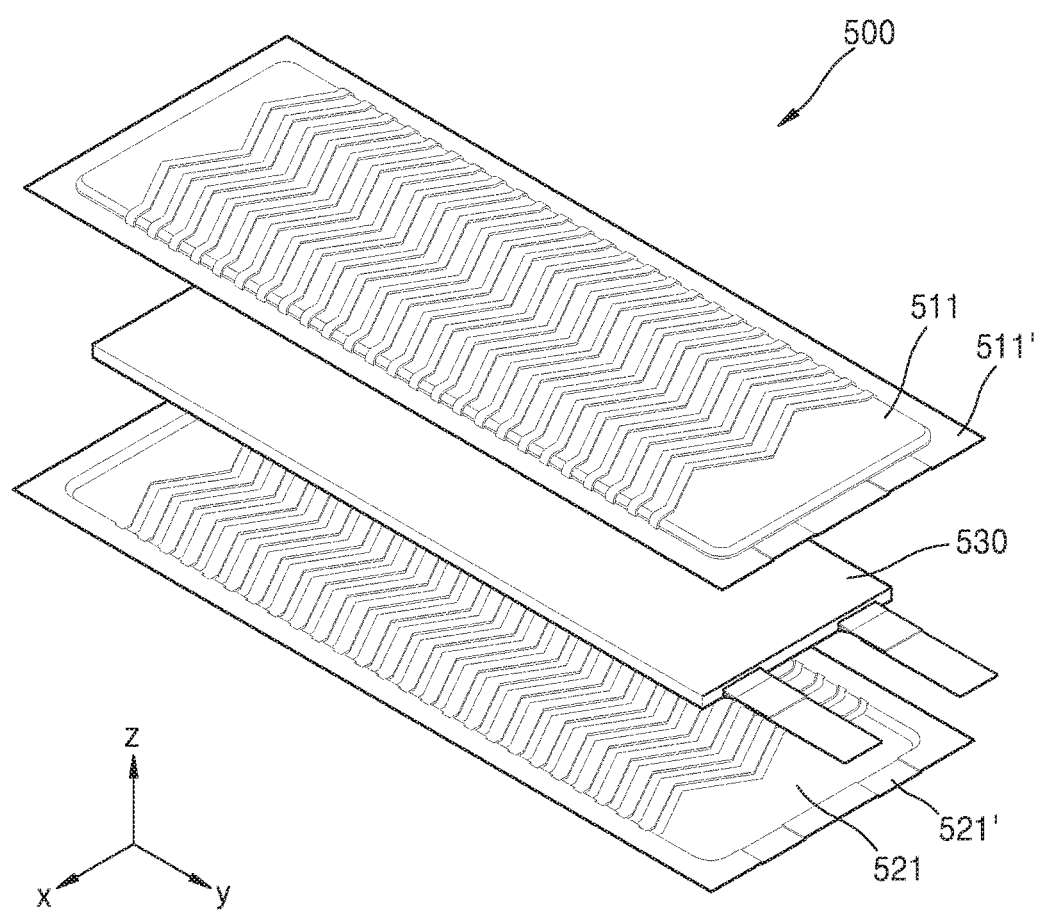
FIG. 22 is an exploded perspective view of an electrochemical device according to an exemplary embodiment.
Figure 23:
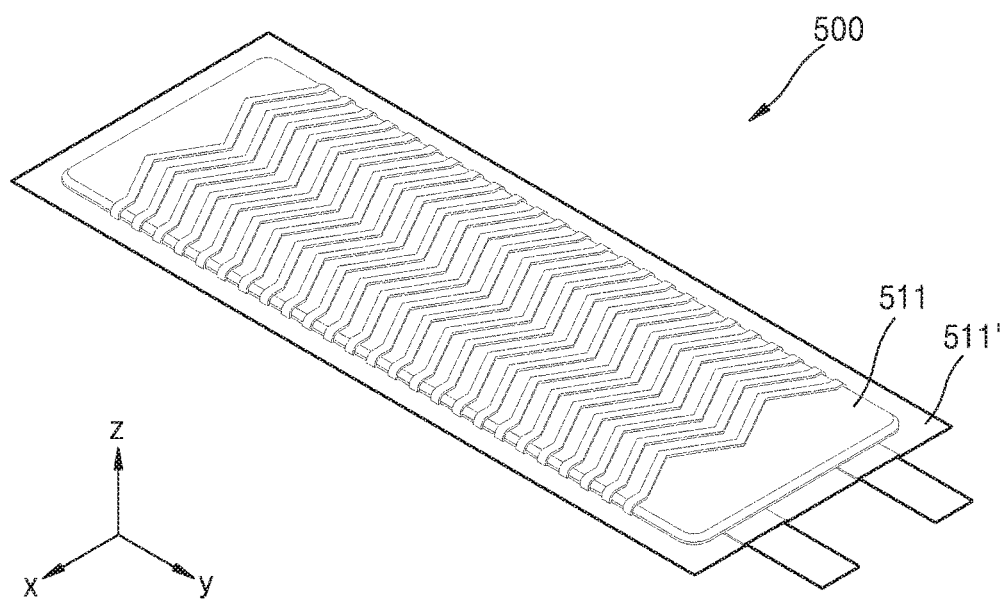
FIG. 23 is a perspective view of the electrochemical device of FIG. 22 in an assembled state.

FIG. 22 is an exploded perspective view of an electrochemical device 500 according to an exemplary embodiment. FIG. 23 is a perspective view of the electrochemical device 500 of FIG. 22 in an assembled state.

Referring to FIGS. 22 and 23, an exemplary embodiment of the electrochemical device 500 may include first and second packages 511 and 521 facing each other, and an electrode assembly 530 between the first and second packages 511 and 521. The first package 511 may be disposed to cover an upper surface of the electrode assembly 530, and the second package 521 may be disposed to cover a lower surface of the electrode assembly 530. Although the electrode assembly 530 may have flexibility, the disclosure is not limited thereto. The adhesive layers 511' and 521' may be respectively disposed or provided on inner surfaces of the first and second packages 511 and 521.

A plurality of linear patters, each having a cross-section of an uneven structure, may be defined or formed on the first package 511. The linear patterns may be defined on the first package 511, in various shapes as described above. A plurality of linear patterns having various shaped may be defined on the second package 521. The linear patterns on the second package 521 may have the same shape as or a different shape from the shape of the linear patterns on the first package 511. Alternatively, no linear patterns may be defined or formed on the second package 521. The electrochemical device 500 may be manufactured by inserting the electrode assembly 530 between the first package 511 and the second package 521, filling an electrolyte (not shown) between the first and second packages 511 and 521, and binding the first package 511 and the second package 521 to each other using the adhesive layers 511' and 521'.

Figure 24A:
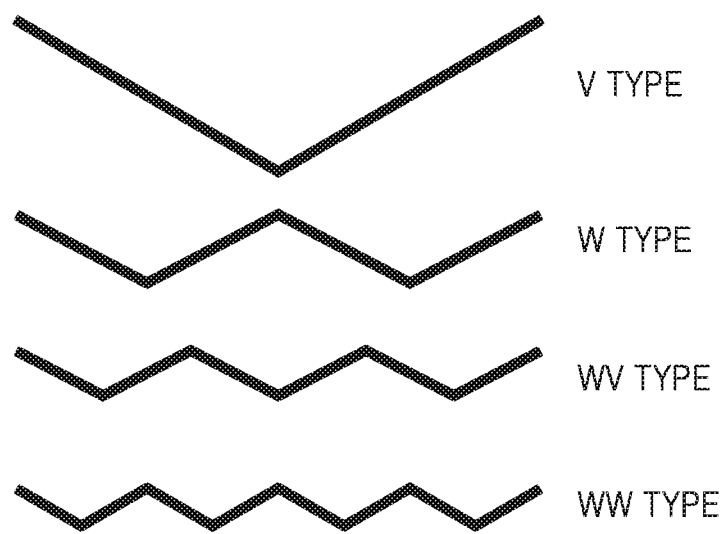
FIGS. 24A and 24B illustrate a twisting angle according to the shape of a linear pattern.
Figure 24B:
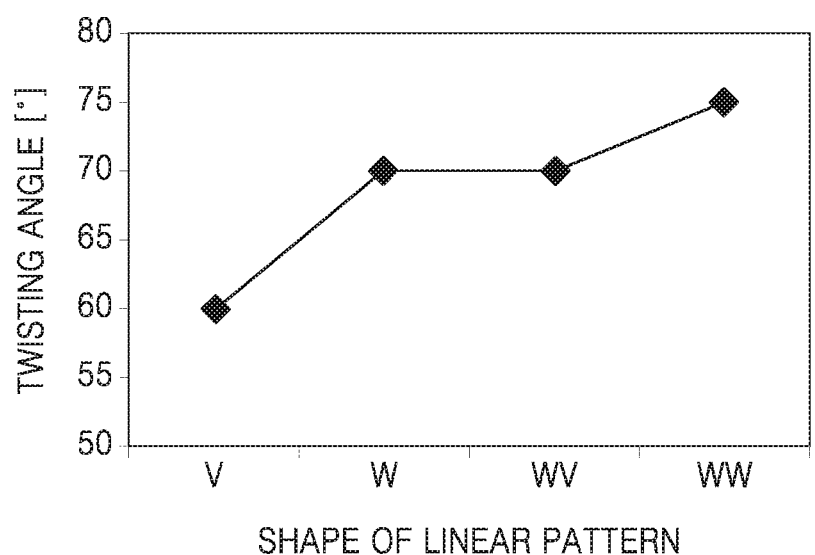

FIGS. 24A and 24B illustrate a twisting angle according to the shape of a linear pattern.

FIG. 24A illustrates four types of linear patterns including a "V" type linear pattern, a "W" type linear pattern, a "WV" type linear pattern, and a "WW" type linear pattern. FIG. 24B illustrates a twisting angle at which a wrinkle is generated when electrochemical devices including each of the four linear patterns illustrated in FIG. 24A are twisted. The electrochemical device is manufactured to be about 70 millimeter (mm) long, 28 mm wide, and 1.3 mm thick, which is the same as in the following description. As shown in FIG. 24B, the twisting angle at which a wrinkle is generated becomes the largest in the electrochemical device having a "VWV" type linear pattern.

Figure 25A:
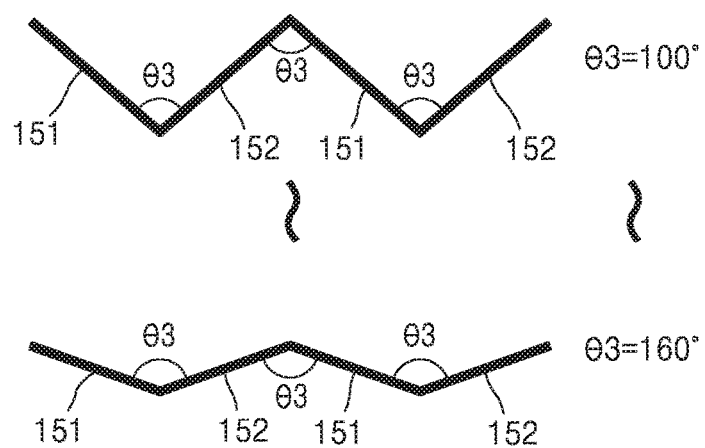
FIGS. 25A to 25C illustrate a twisting angle according to an in-between angle θ3 of a linear pattern, and a maximum stress.
Figure 25B:
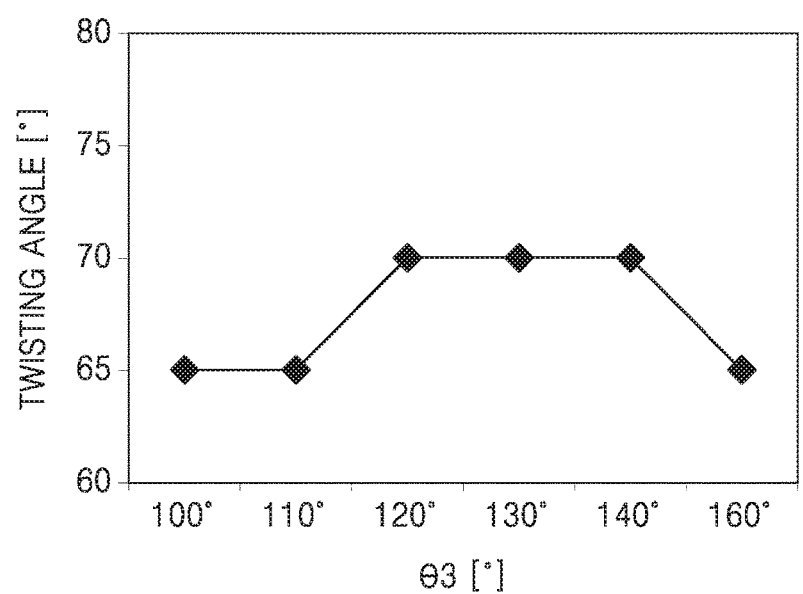
Figure 25C:
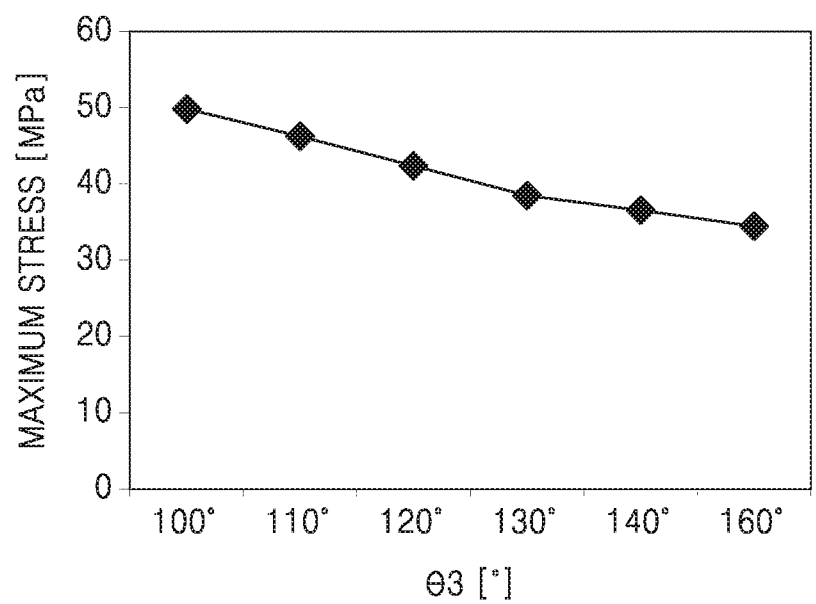

FIGS. 25A to 25C illustrate a twisting angle according to an in-between angle θ3 of a linear pattern, and a maximum stress.

FIG. 25A illustrates "W" type linear patterns in which the in-between angle 83 between the first element line 151 and the second element line 152 is about 100°, about 110°, about 120°, about 130°, about 140°, and about 160°, respectively. FIG. 25B illustrates twisting angles at which a wrinkle is generated when electrochemical devices including the linear patterns illustrated in FIG. 24A are twisted. As shown in FIG. 25B, the twisting angle at which a wrinkle is generated becomes the largest when the in-between angle θ3 of the first element line 151 and the second element line 152 is about 120°, about 130°, and about 140°. FIG. 25C illustrates the maximum stress measured when the electrochemical devices including the linear patterns illustrated in FIG. 24A are twisted. As shown in FIG. 25C, the maximum stress occurs in the electrochemical device in which the in-between angle θ3 of the first element line 151 and the second element line 152 is about 100°.

Figure 26A:
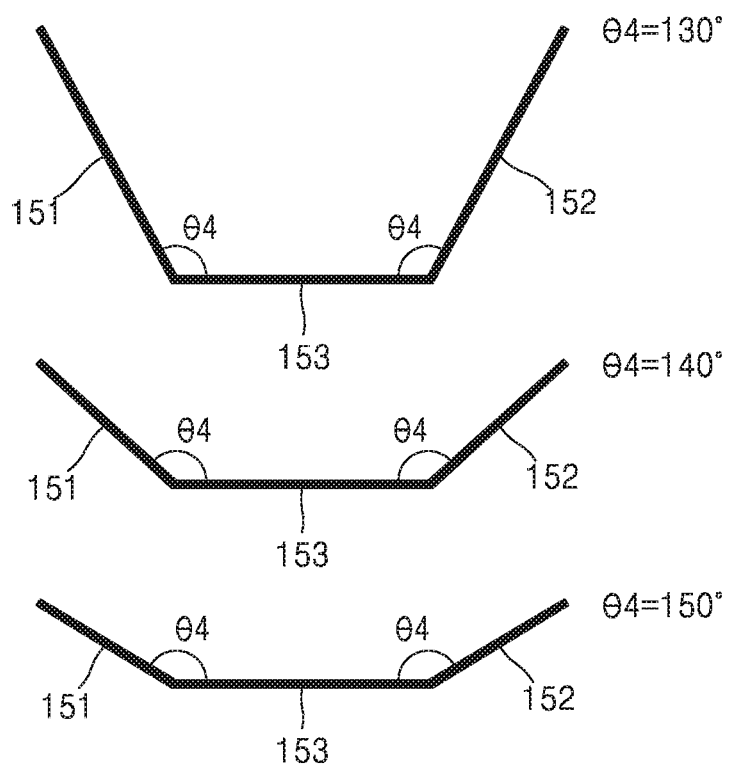
FIGS. 26A and 26B illustrate a twisting angle according to an angle θ4 of a linear pattern.
Figure 26B:
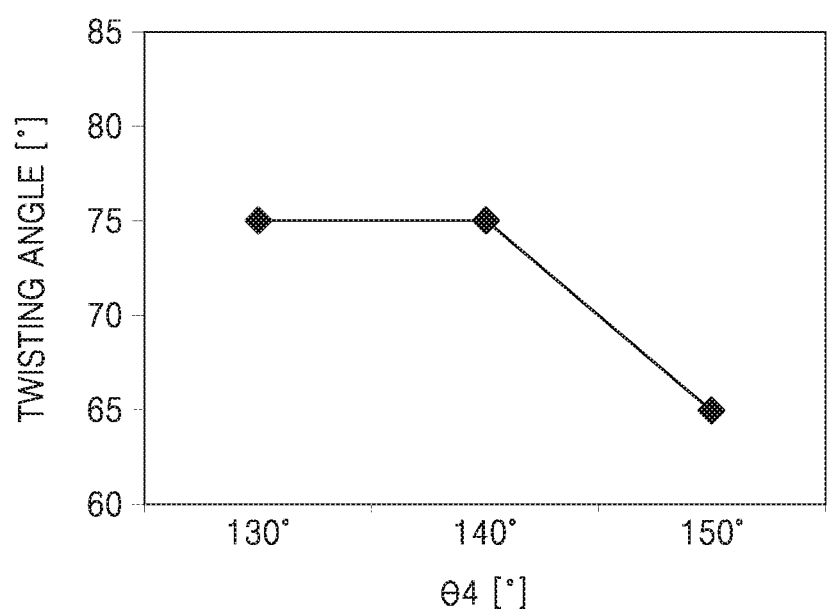

FIGS. 26A and 26B illustrate a twisting angle according to an angle θ4 of a linear pattern.

FIG. 26A illustrates linear patterns in which an in-between angle θ4 of one of the first element line 151 and the second element line 152, and the third element line 153 is about 130°, about 140°, and about 150°. FIG. 26B illustrates twisting angles at which a wrinkle is generated when electrochemical devices including the linear patterns illustrated in FIG. 26A are twisted. As shown in FIG. 26B, the twisting angle at which a wrinkle is generated becomes the largest when the in-between angle θ4 of the first/second element line 151/152 and the third element line 153 is about 130° and about 140°.

Figure 27A:
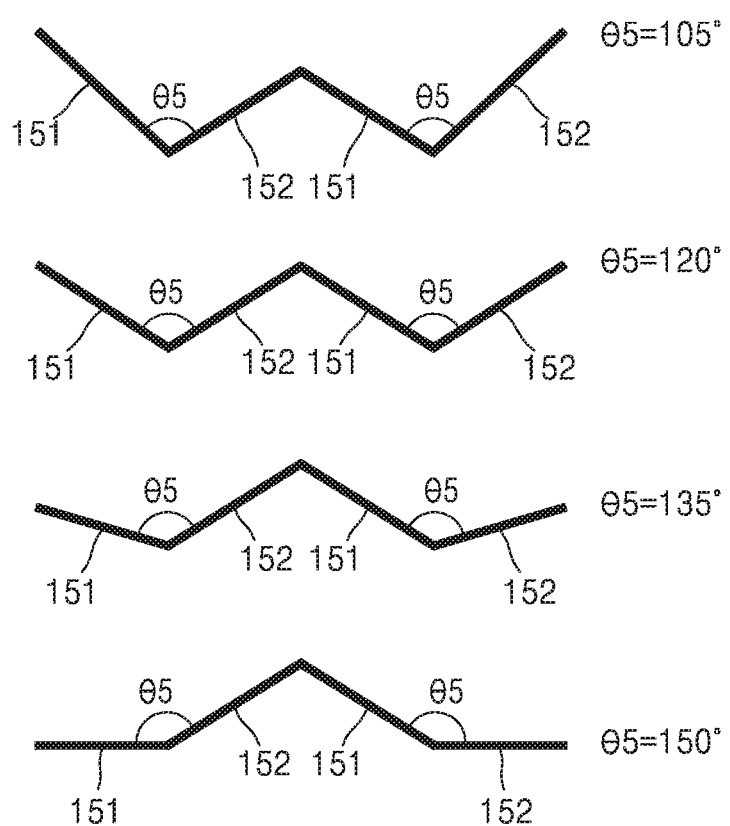
FIGS. 27A and 27B illustrate a twisting angle according to an outer in-between angle θ5 of a linear pattern.
Figure 27B:
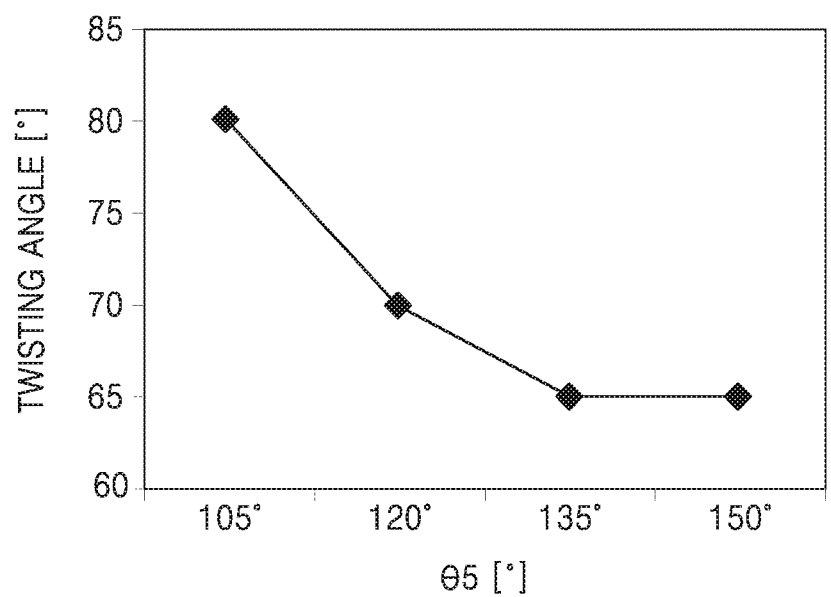

FIGS. 27A and 27B illustrate a twisting angle according to an outer in-between angle θ5 of a linear pattern.

FIG. 27A illustrates "W" type linear patterns in which the outer in-between angle θ5 of the first element line 151 and the second element line 152 is about 105°, about 120°, about 135°, and about 150° . FIG. 27B illustrates twisting angles at which a wrinkle is generated when electrochemical devices including the linear patterns illustrated in FIG. 27A are twisted. As shown in FIG. 27B, the twisting angle at which a wrinkle is generated becomes the largest when the outer in-between angle θ5 of the first element line 151 and the second element line 152 is about 105°.

Figure 28A:
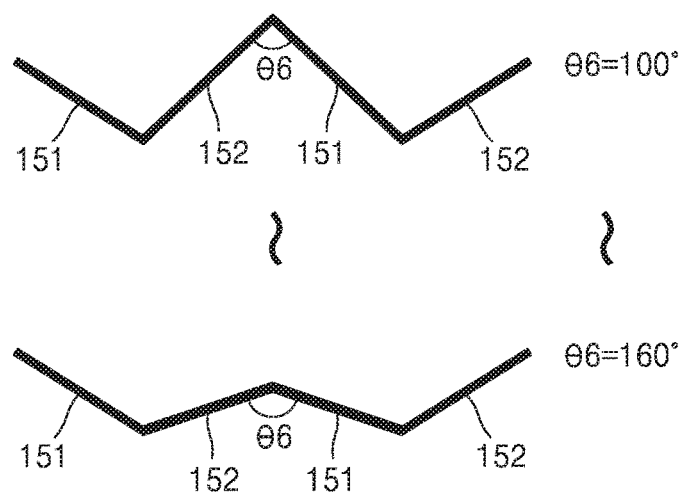
FIGS. 28A and 28B illustrate a twisting angle according to an inner in-between angle θ6 of a linear pattern.
Figure 28B:
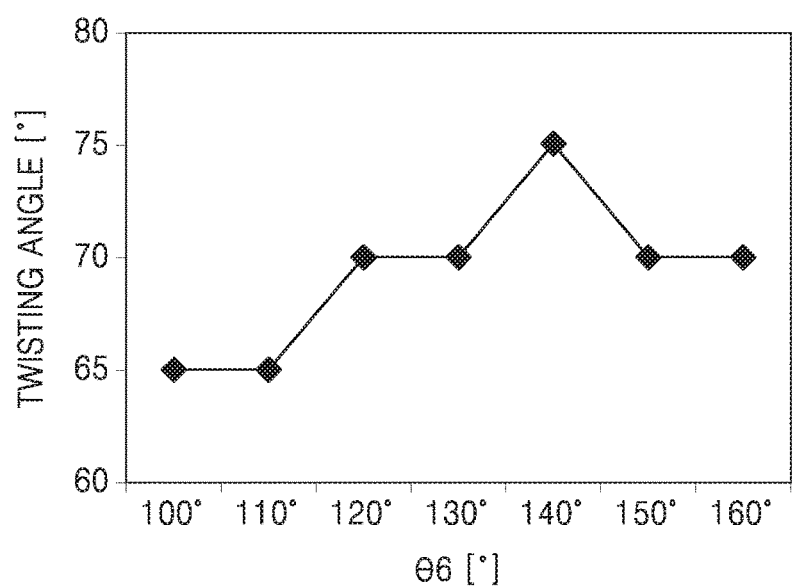

FIGS. 28A and 28B illustrate a twisting angle according to an inner in-between angle θ6 of a linear pattern.

FIG. 28A illustrates "W" type linear patterns in which an inner in-between angle θ6 of the first element line 151 and the second element line 152 is about 100°, about 110°, about 120°, about 130°, about 140°, about 150°, and about 160°. FIG. 28B illustrates twisting angles at which a wrinkle is generated when electrochemical devices including the linear patterns illustrated in FIG. 28A are twisted. As shown in FIG. 28B, the twisting angle at which a wrinkle is generated becomes the largest when the inner in-between angle θ5 of the first element line 151 and the second element line 152 is about 140°.

In an exemplary embodiment, as described above, each of the linear patterns having a cross-section of an uneven structure and defined on an exterior package includes a plurality of first and second element lines, which extend in in different directions on a plane perpendicular to the thickness direction of an electrode assembly, such that the generation of a wrinkle due to bending and/or twisting deformation may be effectively prevented. Accordingly, when an electrochemical device is manufactured using the exterior package including the linear patterns, even when bending deformation and/or twisting deformation are repeatedly applied to the electrochemical device, the generation of a wrinkle in the exterior package may be substantially restricted and thus the formation of a pinhole in the exterior package or damage to the exterior package may be effectively prevented.

It should be understood that exemplary embodiments described herein should be considered in a descriptive sense only and not for purposes of limitation. Descriptions of features or aspects within each exemplary embodiment should typically be considered as available for other similar features or aspects in one or more exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An exterior package for an electrode assembly of an electrochemical device, the exterior package comprising:
   a plurality of linear patterns,
   wherein
   each of the linear patterns has a cross-section of an uneven structure in a thickness direction of the electrode assembly, and
   a linear pattern of the linear patterns comprises a first element line and a second element line, which extend in different directions from each other when viewed from a plan view in the thickness direction of the electrode assembly,
   wherein the linear pattern is spaced apart from an adjacent linear pattern of the linear patterns when viewed from the plan view in the thickness direction of the electrode assembly.

2. The exterior package for an electrochemical device of claim 1, wherein the first and second element lines are inclined with respect to a first direction perpendicular to the thickness direction of the electrode assembly.

3. The exterior package for an electrochemical device of claim 2, wherein the first direction is a widthwise direction of the electrode assembly or a lengthwise direction of the electrode assembly.

4. The exterior package for an electrochemical device of claim 2, wherein the linear patterns are repeatedly arranged in a second direction perpendicular to the first direction and the thickness direction of the electrode assembly.

5. The exterior package for an electrochemical device of claim 2, wherein the first and second element lines are alternately disposed in the first direction.

6. The exterior package for an electrochemical device of claim 2, wherein the linear pattern further comprises a third element line disposed between the first element line and the second element line and parallel to the first direction.

7. The exterior package for an electrochemical device of claim 6, wherein the third element line is connected to or spaced apart from at least one of the first and second element lines.

8. The exterior package for an electrochemical device of claim 6, wherein the third element line has at least one of a linear shape and a curved shape.

9. The exterior package for an electrochemical device of claim 1, wherein each of the first and second element lines has at least one of a linear shape and a curved shape.

10. The exterior package for an electrochemical device of claim 1, wherein the first and second element lines are connected to or spaced apart from each other.

11. The exterior package for an electrochemical device of claim 10, wherein a connection portion of the first and second element lines has a curved shape.

12. The exterior package for an electrochemical device of claim 1, wherein
    each of the first element line and the second element line is provided in plural, and
    an angle between adjacent first and second element lines is different from an angle between another adjacent first and second element lines.

13. The exterior package for an electrochemical device of claim 1, wherein the linear patterns are defined in at least a part of the exterior package.

14. The exterior package for an electrochemical device of claim 1, wherein the linear patterns extend to opposite edges of the exterior package.

15. The exterior package for an electrochemical device of claim 1, wherein the linear patterns have an identical shape or different shapes.

16. The exterior package for an electrochemical device of claim 1, wherein at least one of the linear patterns has a different shape from another of the linear patterns.

17. The exterior package for an electrochemical device of claim 1, wherein intervals between the linear patterns are identical to or different from each other.

18. The exterior package for an electrochemical device of claim 1, wherein an interval between two adjacent linear patterns is different from an interval between other two adjacent linear patterns.

19. The exterior package for an electrochemical device of claim 1, further comprising: an additional pattern disposed between the linear patterns.

20. The exterior package for an electrochemical device of claim 1, further comprising: an additional pattern disposed to cross the linear patterns.

21. The exterior package for an electrochemical device of claim 1, further comprising a gas barrier layer comprising the linear patterns.

22. The exterior package for an electrochemical device of claim 21, further comprising an adhesive layer disposed on the gas barrier layer.

23. The exterior package for an electrochemical device of claim 1, further comprising:
    a first package disposed to cover an upper surface of the electrode assembly; and
    a second package bonded to the first package to cover a lower surface of the electrode assembly.

24. The exterior package for an electrochemical device of claim 23, wherein the first package comprises the linear patterns.

25. The exterior package for an electrochemical device of claim 24, wherein the second package comprises the linear patterns.

26. An electrochemical device comprising:
    an electrode assembly; and
    an exterior package which surrounds the electrode assembly,
    wherein
    the exterior package comprises a plurality of linear patterns,
    each of the linear patterns has a cross-section of an uneven structure in a thickness direction of the electrode assembly, and a linear pattern of the linear patterns comprises a first element line and a second element line, which extend in different directions from each other when viewed from a plan view in the thickness direction of the electrode assembly, wherein the linear pattern is spaced apart from an adjacent linear pattern of the linear patterns when viewed from the plan view in the thickness direction of the electrode assembly.

27. The electrochemical device of claim 26, wherein the first and second element lines are inclined with respect to a first direction perpendicular to the thickness direction of the electrode assembly.

28. The electrochemical device of claim 27, wherein the linear patterns are repeatedly disposed in a second direction perpendicular to the first direction and the thickness direction of the electrode assembly.

29. The electrochemical device of claim 27, wherein the linear pattern further comprises a third element line disposed between the first element line and the second element line and parallel to the first direction.

30. The electrochemical device of claim 26, wherein the linear patterns extend to opposite edges of the electrode assembly.

31. The electrochemical device of claim 26, further comprising:

an additional pattern disposed between the linear patterns.

32. The electrochemical device of claim 26, wherein the exterior package further comprises a gas barrier layer comprising the linear patterns.

33. The electrochemical device of claim 26, wherein the exterior package further comprises:

a first package disposed to cover an upper surface of the electrode assembly; and a second package bonded to the first package to cover a lower surface of the electrode assembly.

34. The electrochemical device of claim 33, wherein the first package comprises the linear patterns.

35. The electrochemical device of claim 34, wherein the second package comprises the linear patterns.

* * * * *